(12) United States Patent
Burg et al.

(10) Patent No.: US 8,360,385 B2
(45) Date of Patent: Jan. 29, 2013

(54) TIE DOWN ASSEMBLY

(75) Inventors: James Burg, Verona, PA (US); David Silvio, Natrona Heights, PA (US); Eric G. Bogan, Cabot, PA (US); Robert J. Speer, Upper Burrell, PA (US); Brett P. Conner, Allison Park, PA (US)

(73) Assignee: Alcoa Inc., Pittsburgh, PA (US)

( * ) Notice: Subject to any disclaimer, the term of this patent is extended or adjusted under 35 U.S.C. 154(b) by 268 days.

(21) Appl. No.: 12/853,868

(22) Filed: Aug. 10, 2010

(65) Prior Publication Data
US 2011/0210227 A1  Sep. 1, 2011

Related U.S. Application Data

(60) Provisional application No. 61/274,153, filed on Aug. 13, 2009.

(51) Int. Cl.
*B65D 63/00* (2006.01)
(52) U.S. Cl. ......... 248/499; 410/101; 410/108; 410/113
(58) Field of Classification Search .................. 248/499; 410/101, 106, 108, 109, 112, 113, 116
See application file for complete search history.

(56) References Cited

U.S. PATENT DOCUMENTS

| | | | |
|---|---|---|---|
| 3,365,162 A | 1/1968 | Davis | |
| 3,427,996 A * | 2/1969 | Alvarados | 410/112 |
| 3,694,866 A * | 10/1972 | Maier | 24/115 J |
| 3,888,190 A * | 6/1975 | Bigge | 410/101 |
| 3,927,623 A | 12/1975 | Caron | |
| 4,091,744 A | 5/1978 | Crissy et al. | |
| 4,099,661 A | 7/1978 | Dick et al. | |
| 4,151,974 A * | 5/1979 | Kuhn | 248/499 |
| 4,193,529 A | 3/1980 | Dick et al. | |
| 4,877,361 A | 10/1989 | DeRosa et al. | |
| 4,907,921 A | 3/1990 | Akright | |
| 4,945,849 A | 8/1990 | Morris et al. | |
| 5,052,869 A | 10/1991 | Hansen, II | |
| 5,535,694 A | 7/1996 | Czipri | |
| 6,585,466 B2 * | 7/2003 | Zhan et al. | 410/116 |
| 6,709,209 B2 * | 3/2004 | Zhan et al. | 410/116 |
| 6,764,259 B1 | 7/2004 | Preta | |
| 6,935,602 B2 | 8/2005 | Hardie | |

(Continued)

FOREIGN PATENT DOCUMENTS

| | | |
|---|---|---|
| DE | 199 04 366 | 6/2000 |
| EP | 0 424 083 | 4/1991 |

(Continued)

OTHER PUBLICATIONS

International Search Report and Written Opinion for PCT/US2010/027317, mailed Jun. 22, 2011.

(Continued)

*Primary Examiner* — Bradley Duckworth
(74) *Attorney, Agent, or Firm* — Greenberg Traurig, LLP

(57) ABSTRACT

A tie down assembly adapted to be installed within a structure includes a cup and a plate fastened removably to the cup by fasteners. The cup includes a first sidewall, an interior portion, and a plurality of seats that extends within the interior portion. The plate an aperture to receive tie down connectors. The plate includes a plurality of tabs. The plate is positioned within the interior portion of the cup and rests on the seats. When the plate requires repair or replacement, it may be removed from the cup by unfastening the fasteners without the need to remove the cup from the structure. Each of the tabs of the plate is positioned within a space between adjacent pairs of the seats of the cup and is adapted to engage the seats of the cup so as to inhibit rotation of the plate relative to the cup.

22 Claims, 24 Drawing Sheets

U.S. PATENT DOCUMENTS

| | | |
|---|---|---|
| 7,134,819 B2 | 11/2006 | Bullock et al. |
| 7,390,155 B1 | 6/2008 | Diaz et al. |
| 7,686,551 B2 * | 3/2010 | Grasso .......................... 410/107 |
| 7,798,753 B2 * | 9/2010 | Yurgevich ..................... 410/115 |
| 8,075,232 B2 | 12/2011 | Le |
| 8,220,209 B2 * | 7/2012 | Roy et al. ........................ 52/156 |
| 2004/0099197 A1 | 5/2004 | King |
| 2006/0054068 A1 | 3/2006 | Fockler et al. |
| 2006/0133907 A1 | 6/2006 | Bullock et al. |
| 2008/0087782 A1 | 4/2008 | Sutherland et al. |
| 2010/0284758 A1 | 11/2010 | Le |
| 2011/0284716 A1 | 11/2011 | Silvio et al. |
| 2012/0107067 A1 * | 5/2012 | Meszaros ...................... 410/101 |

FOREIGN PATENT DOCUMENTS

| | | |
|---|---|---|
| EP | 1 609 717 | 12/2005 |
| WO | 2009/132390 A1 | 11/2009 |

OTHER PUBLICATIONS

Hull Standard Drawing—Aircraft Securing and Engine Run-Up Fittings, Department of the Navy, Naval Ships System Command, Drawing No. F53711803/1916300N, Jul. 11, 2005 (15 pages).

U.S. Appl. No. 12/723,995, filed Mar. 15, 2010 for Tie Down Assembly (52 pages, including cover page).

International Search Report and Written Opinion issued in connection with Applicants' related International Patent Application No. PCT/US2010/045048 entitled "Tie Down Assembly" (8 pages).

U.S. Appl. No. 12/948,931 on "Tie Down Assembly" filed Nov. 18, 2010 (66 pages).

International Search Report and Written Opinion issued in connection with Applicants' International Application No. PCT/US2010/057189 (6 pages).

* cited by examiner

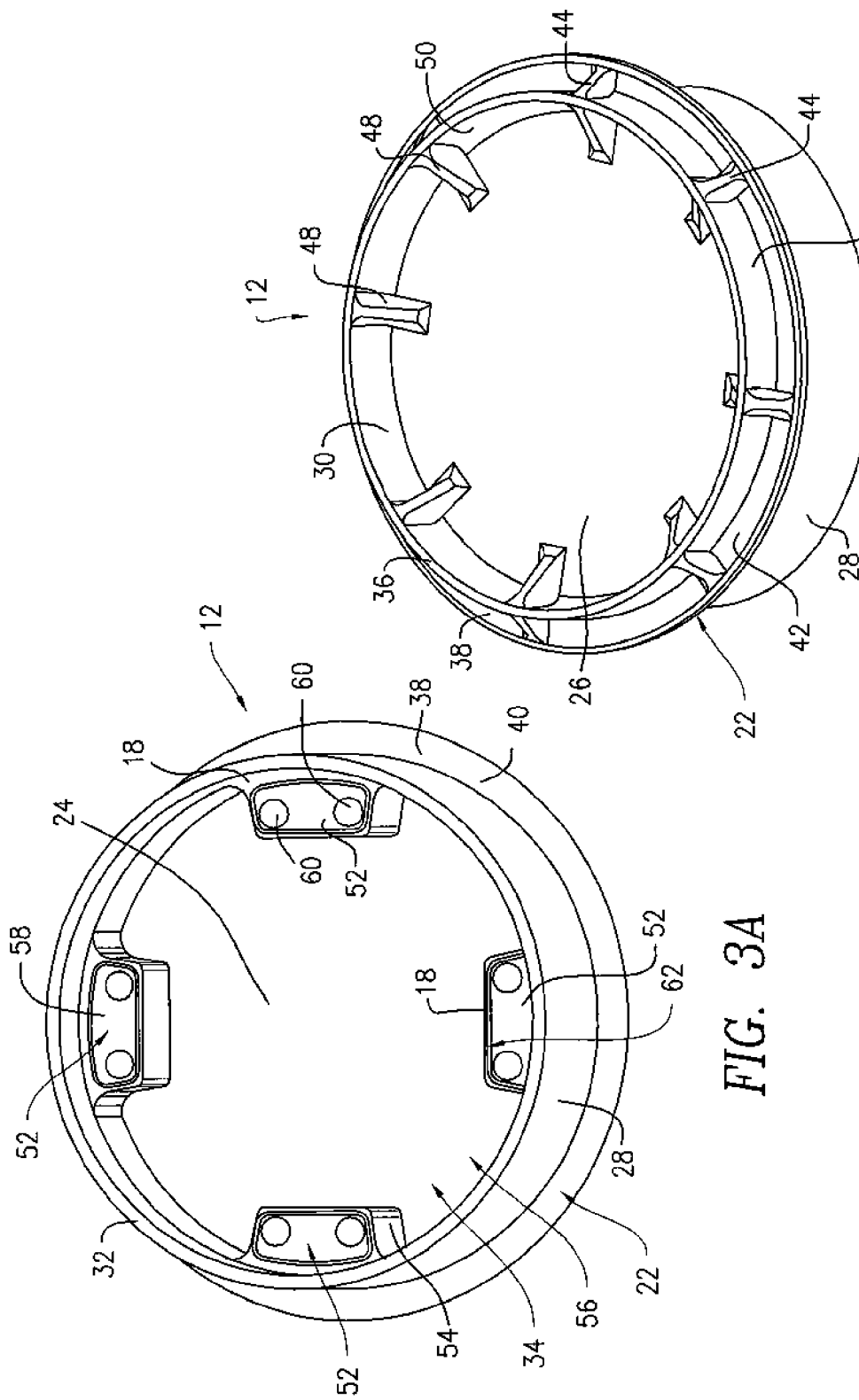

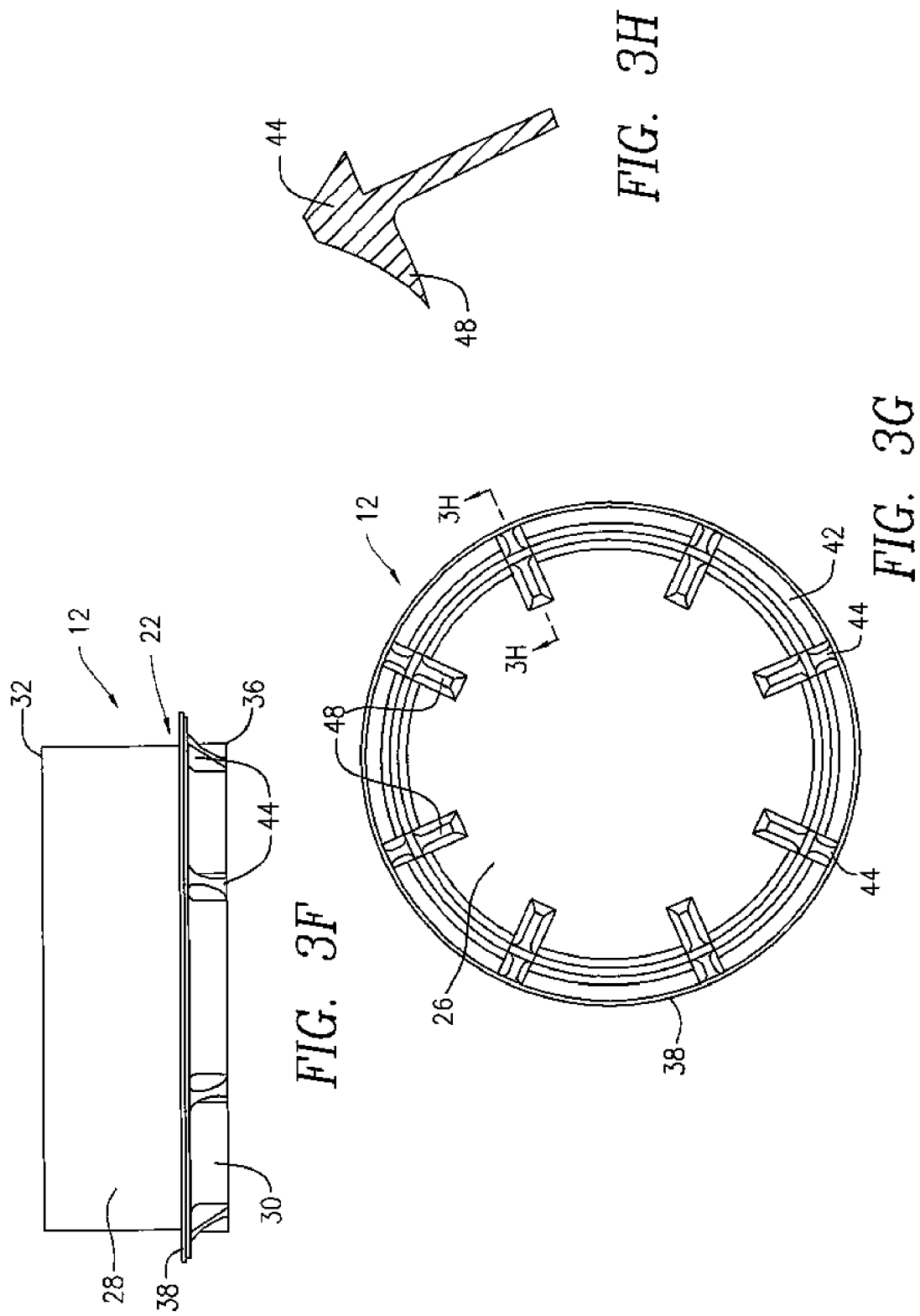

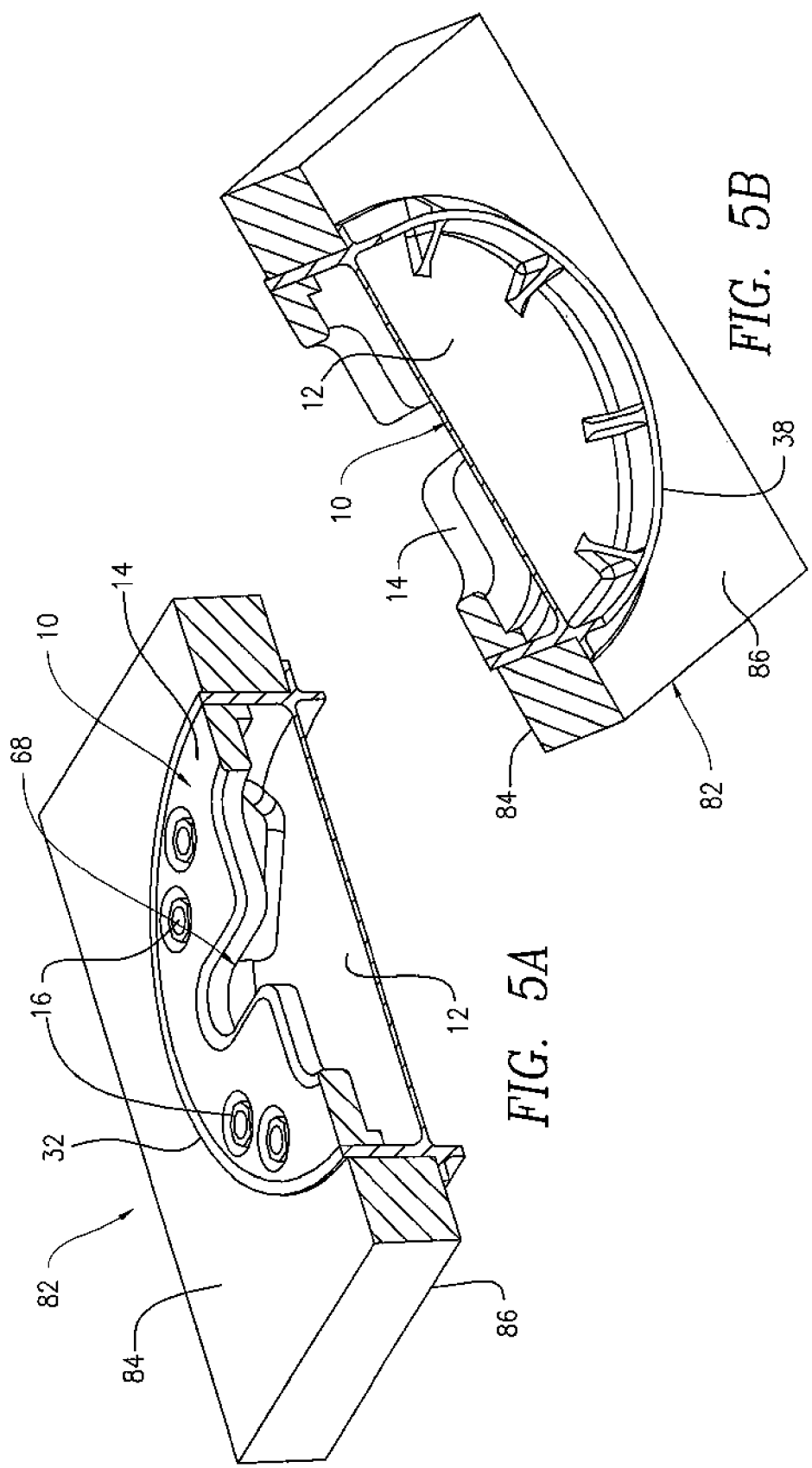

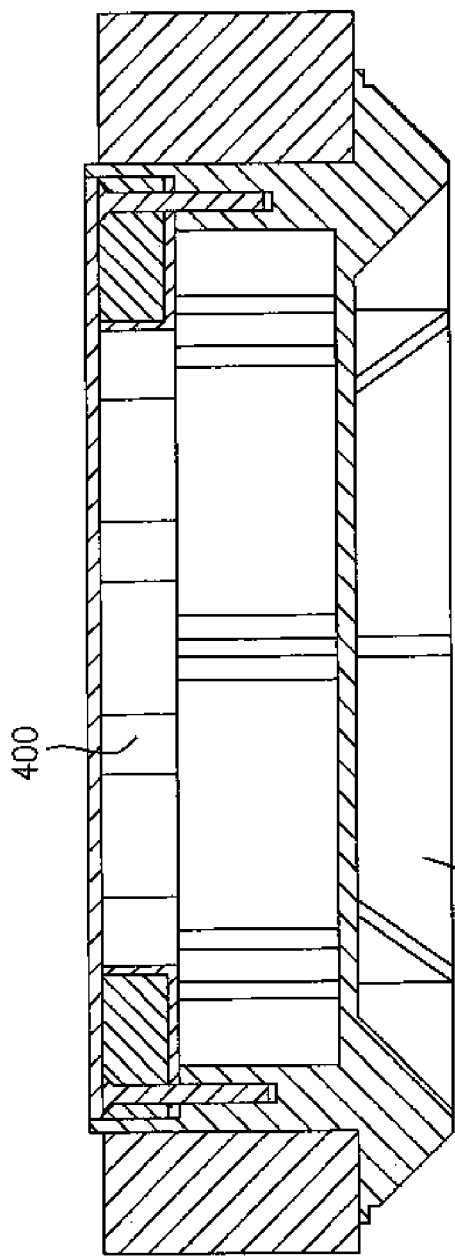
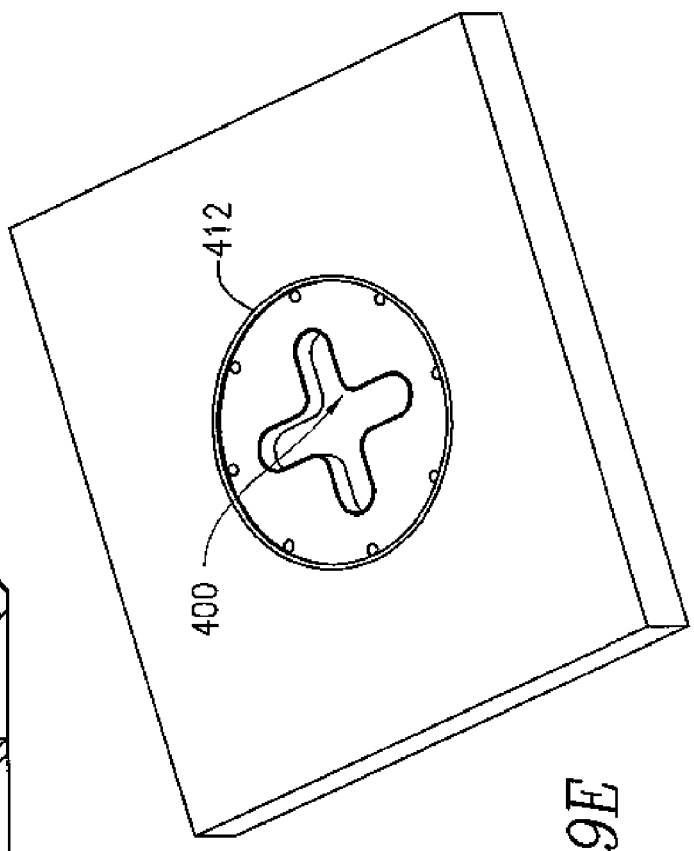
FIG. 9D
FIG. 9E

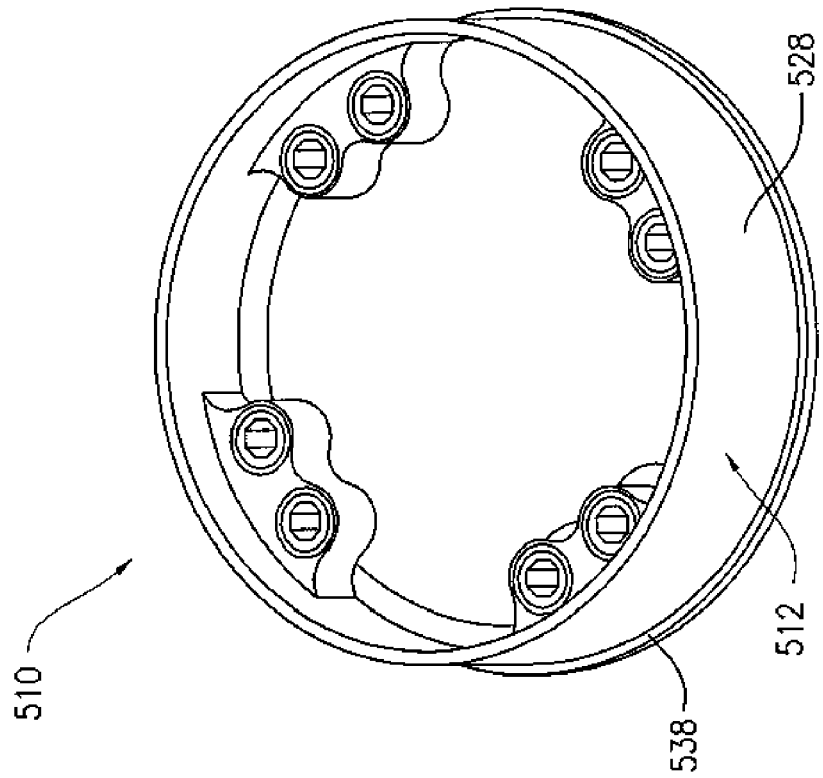
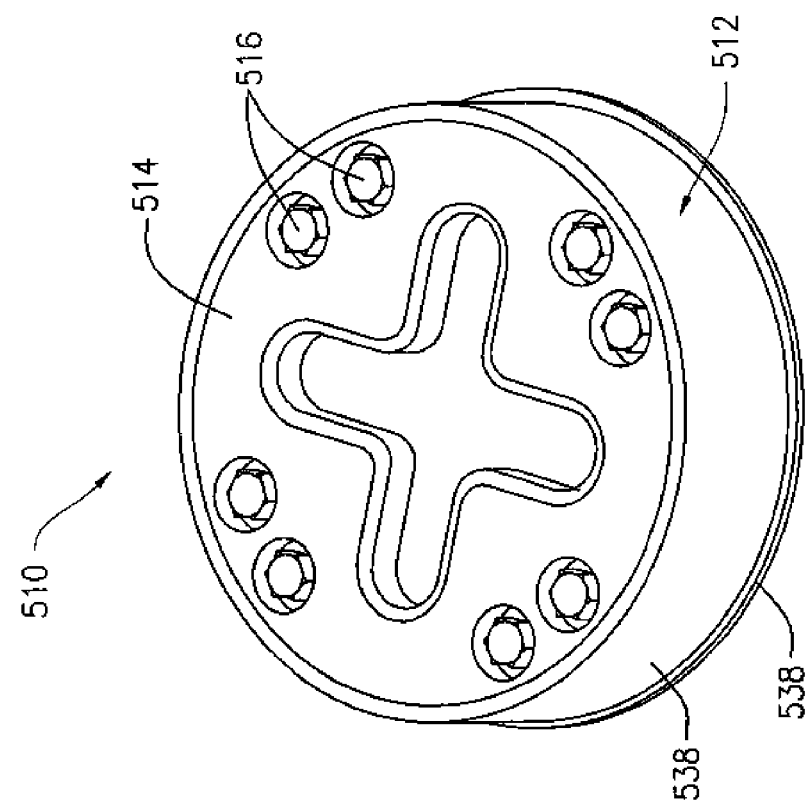

TIE DOWN ASSEMBLY

CROSS-REFERENCE TO RELATED APPLICATION

This application is a Section 111(a) application relating to commonly owned, U.S. Provisional Application Ser. No. 61/274,153 entitled "TIE DOWN ASSEMBLY," filed Aug. 13, 2009, which is incorporated by reference herein in its entirety.

FIELD OF THE INVENTION

The present invention relates to a tie down assembly and, more particularly, to a tie down assembly for naval and maritime vessels.

BACKGROUND OF THE INVENTION

Tie down assemblies are commonplace on naval and maritime vessels, as they facilitate the security of cargo, containers, vehicles (such as aircraft, tanks and trucks), and other heavy items and equipment. Tie down assemblies are typically installed within a deck of the vessel. Tie down assemblies must be sufficiently secured within the deck and be strong enough to endure heavy loads. In addition, it is desirable for tie down assemblies to be easily repaired and replaced within the deck.

SUMMARY OF THE INVENTION

In an embodiment, a tie down assembly adapted to be installed within a structure includes a cup and a plate that is fastened removably to the cup by a plurality of fasteners. In an embodiment, the cup includes a base having a first surface and a second surface opposite the first surface, a first sidewall extending from the first surface and terminating at a first end, and an interior portion defined by the first sidewall. In an embodiment, the cup includes a plurality of seats that extends from the first surface of the cup within the interior portion. In an embodiment, the cup is installed within the structure. In an embodiment, the plate includes a first surface and a second surface opposite the first surface of the plate, and an aperture that extends from the first surface to the second surface of the plate. In an embodiment, the plate includes a plurality of tabs, each of which extends from the second surface of the plate. The plate is positioned within the interior portion of the cup and the second surface of the plate rests on the seats. The aperture of the plate is sized and shaped to receive various tie down connectors. In an embodiment, the cup carries shear loads applied to the tie down assembly. In the event that the plate requires repair or replacement, it may be removed from the cup by unfastening the fasteners and without the need to remove the cup from the structure.

In an embodiment, each of the tabs of the plate is positioned within a space between adjacent pairs of the seats of the cup. In an embodiment, the tabs of the plate are adapted to engage the seats of the cup so as to inhibit rotation of the plate relative to the cup. In another embodiment, the cup includes a second sidewall extending from the second surface of the cup and terminating at a second end opposite the first end of the cup. In an embodiment, the second sidewall of the cup includes a flange extending therefrom. In an embodiment, the flange is welded to the structure and carries a vertical load, and, therefore, the load is not entirely held by the welds. In another embodiment, the tie down assembly includes a wear plate attached removably to the plate in order to protect the plate from damage.

BRIEF DESCRIPTION OF THE DRAWINGS

Reference is made to the following detailed description of the exemplary embodiments considered in conjunction with the accompanying drawings, in which:

FIG. 3A is a top perspective view of a cup employed by the tie down assembly shown in FIG. 1A;

FIG. 3B is a bottom perspective view of the cup shown in FIG. 3A;

FIG. 3F is a side elevational view of the cup shown in FIG. 3A;

FIG. 3G is a bottom plan view of the cup shown in FIG. 3A;

FIG. 3H is a cross-sectional view, taken along line 3H-3H and looking in the direction of the arrows, of the cup shown in FIG. 3G;

FIGS. 5A through 5C are cross-sectional views of the tie down assembly shown in FIG. 1A mounted to a deck of a vessel;

FIGS. 9A through 9E illustrate another embodiment of a wear plate assembly employed by the tie down assembly shown in FIG. 1A; and FIGS. 10A through 10E illustrate a tie down assembly in accordance with another embodiment of the present invention.

DETAILED DESCRIPTION OF THE OF THE EXEMPLARY EMBODIMENTS

Figure 1B:
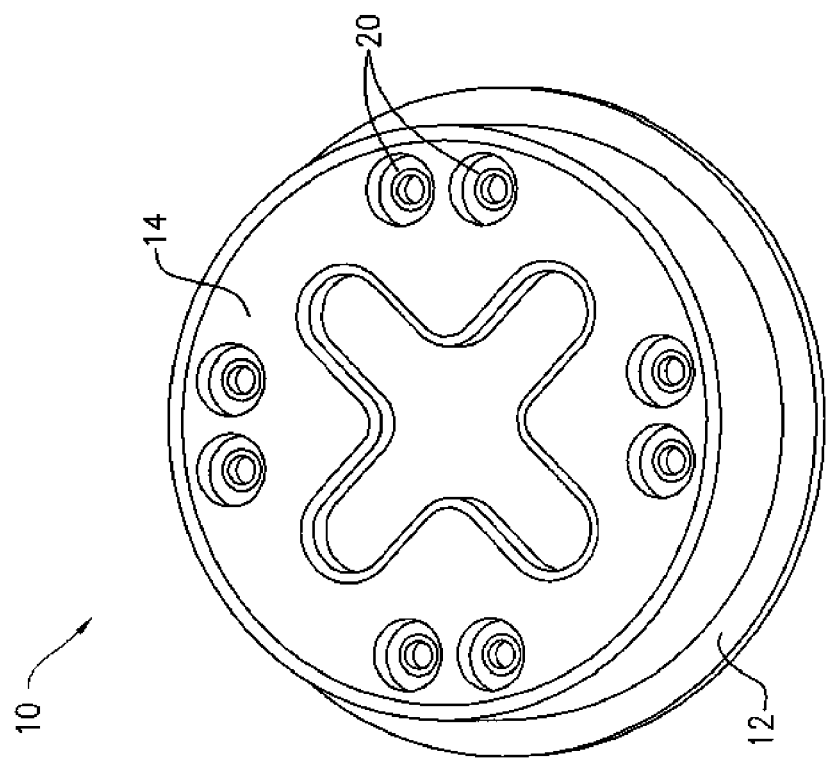
FIG. 1B is a top perspective view of the tie down assembly shown in FIG. 1A, with fasteners employed by the tie down assembly having been removed.
Figure 1A:
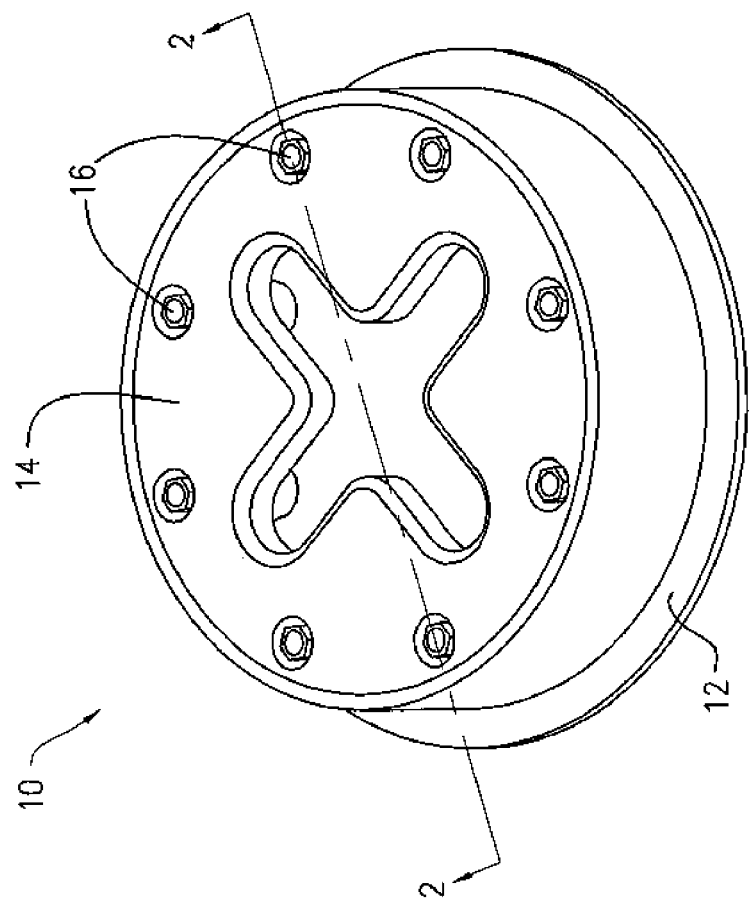
FIG. 1A is a top perspective view of a tie down assembly in accordance with an embodiment of the present invention.
Figure 2:
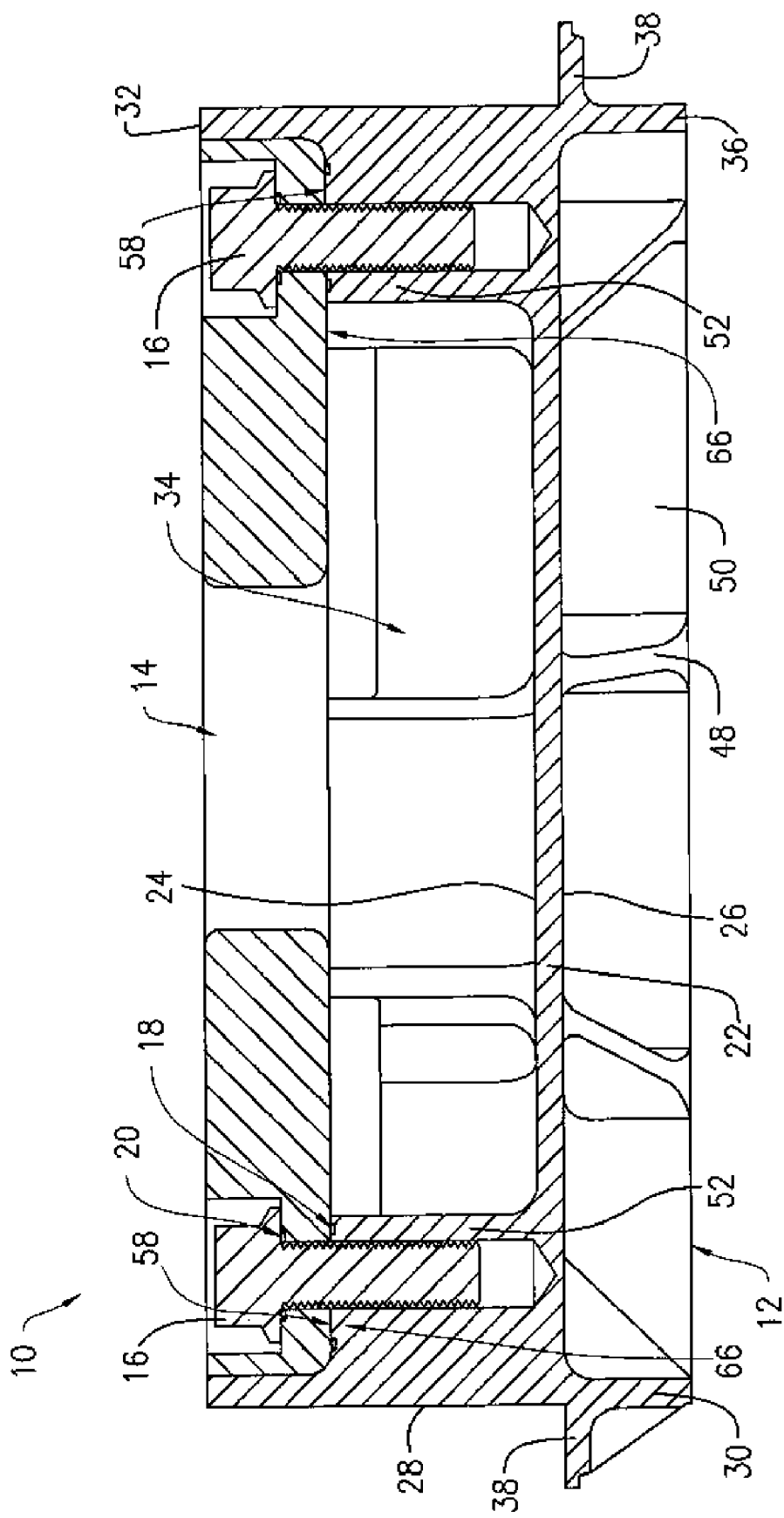
FIG. 2 is a cross-sectional view, taken along line 2-2 and looking in the direction of the arrows, of the tie down assembly shown in FIG. 1A.
Figure 3D:
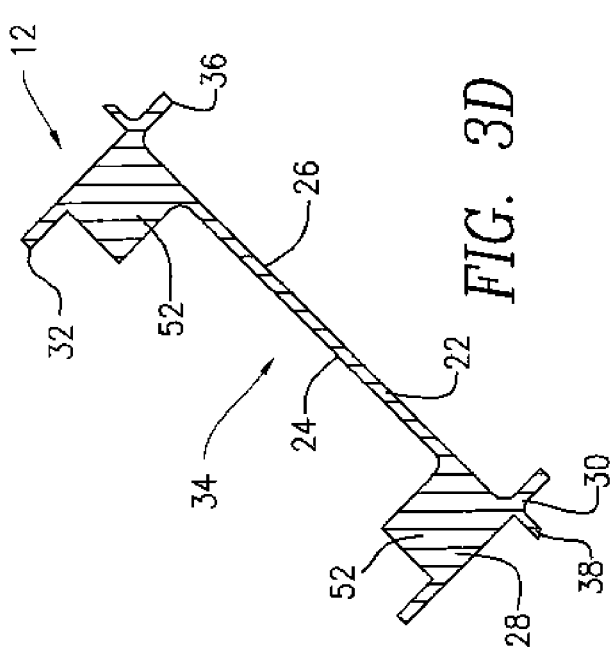
FIG. 3D is a cross-sectional view, taken along line 3D-3D and looking in the direction of the arrows, of the cup shown in FIG. 3C.
Figure 3E:
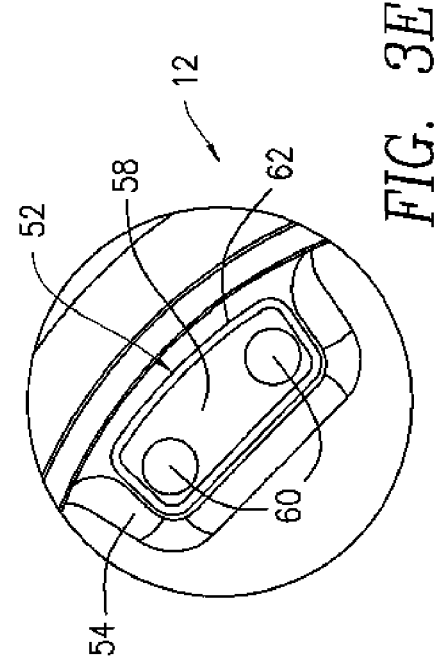
FIG. 3E is an enlarged view of Detail C of the cup shown in FIG. 3C.
Figure 3C:
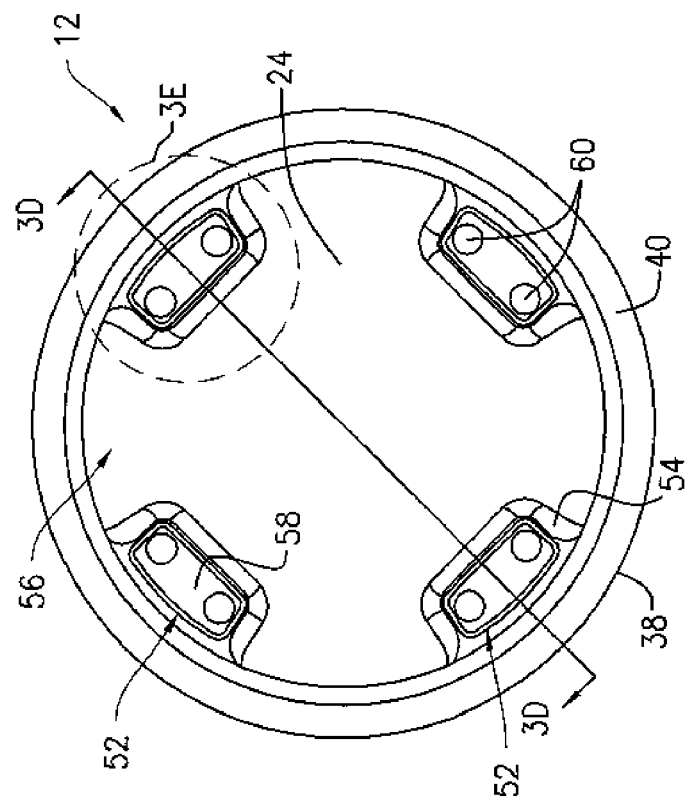
FIG. 3C is a top plan view of the cup shown in FIG. 3A.
Figure 4A:
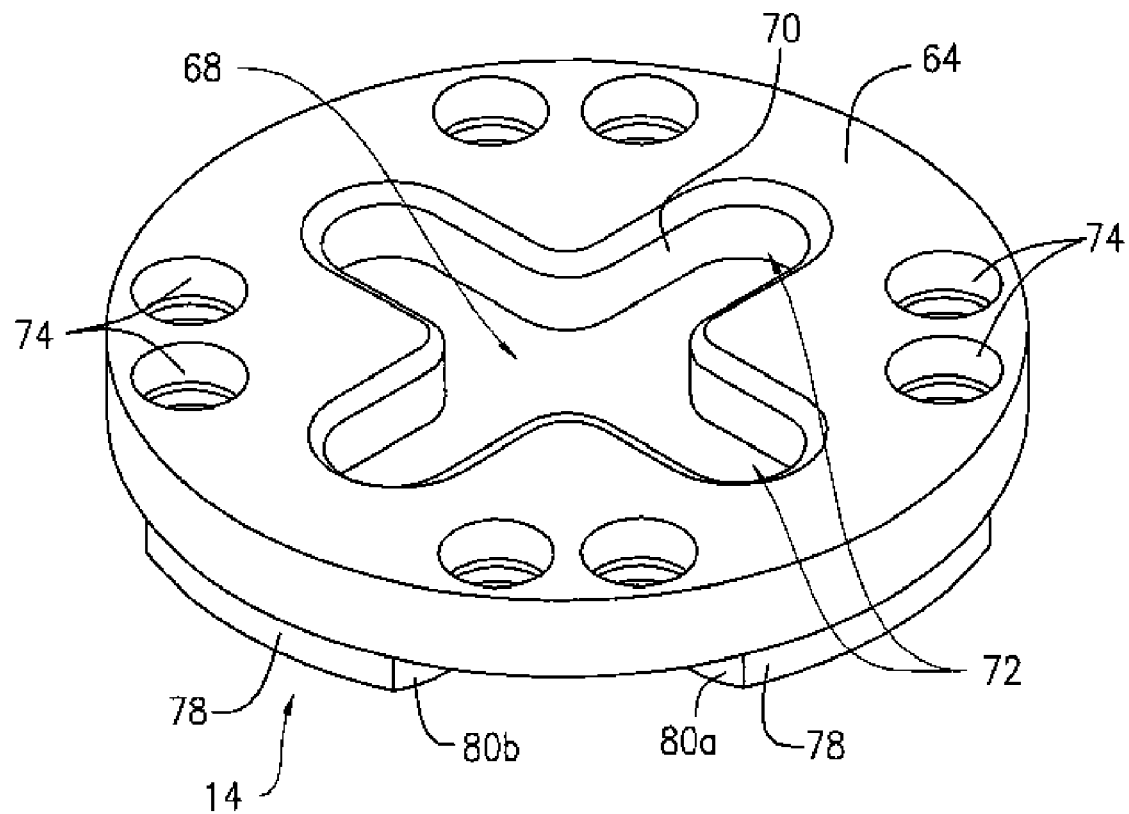
FIG. 4A is a top perspective view of a plate employed by the tie down assembly shown in FIG. 1A.
Figure 4B:
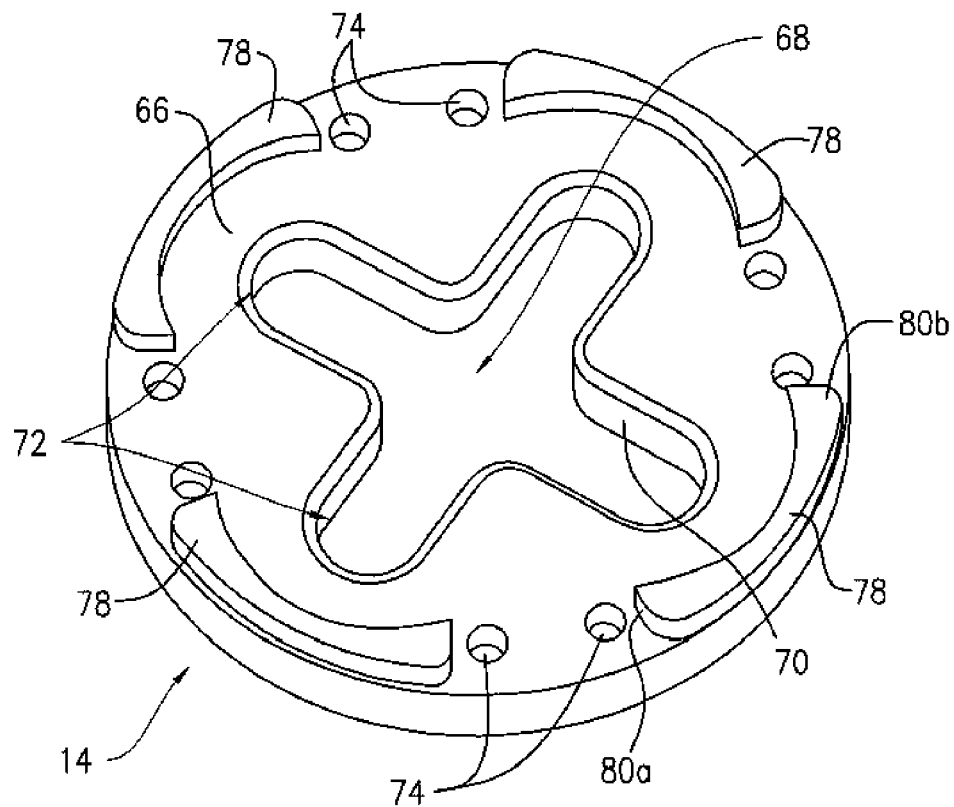
FIG. 4B is a bottom perspective view of the plate shown in FIG. 4A.
Figure 4C:
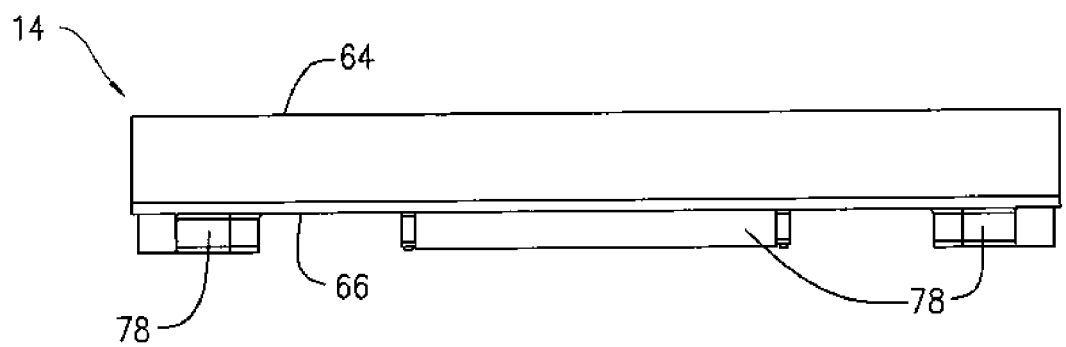
FIG. 4C is a side elevational view of the plate shown in FIG. 4A.
Figure 4E:
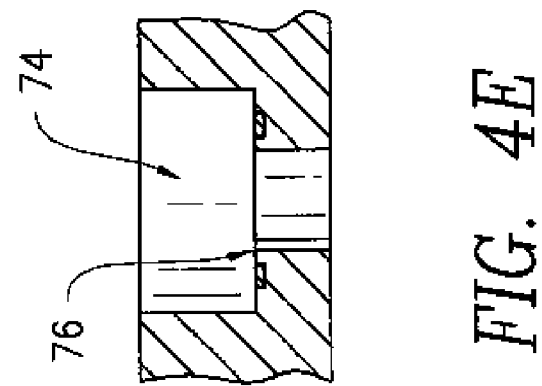
FIG. 4E is a cross-sectional view, taken along line 4E-4E and looking in the direction of the arrows, of the plate shown in FIG. 4D.
Figure 4D:
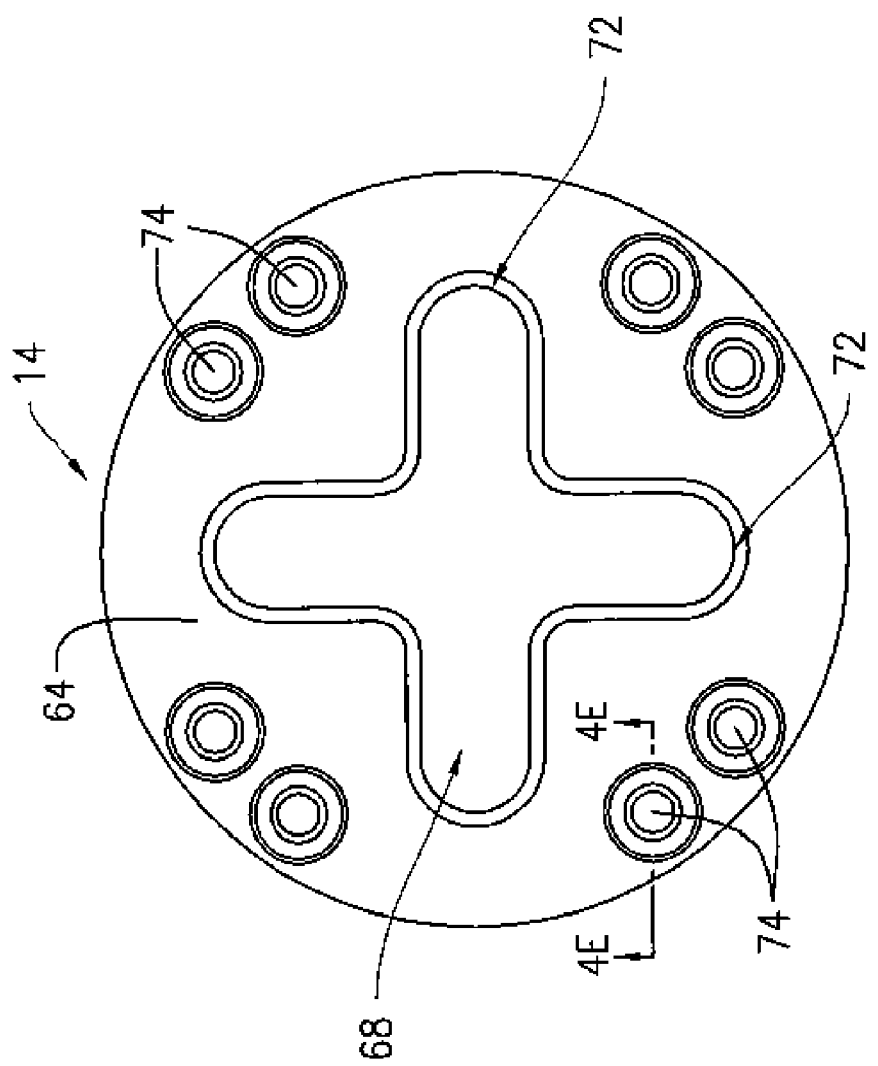
FIG. 4D is top plan view of the plate shown in FIG. 4A.
Figure 4H:
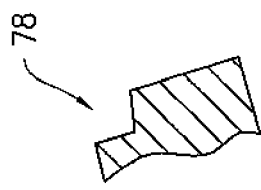
FIG. 4H is a cross-sectional view, taken along line 4H-4H and looking in the direction of the arrows, of the plate shown in FIG. 4F.
Figure 4G:
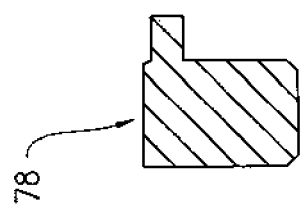
FIG. 4G is a cross-sectional view, taken along line 4G-4G and looking in the direction of the arrows, of the plate shown in FIG. 4F.
Figure 4F:
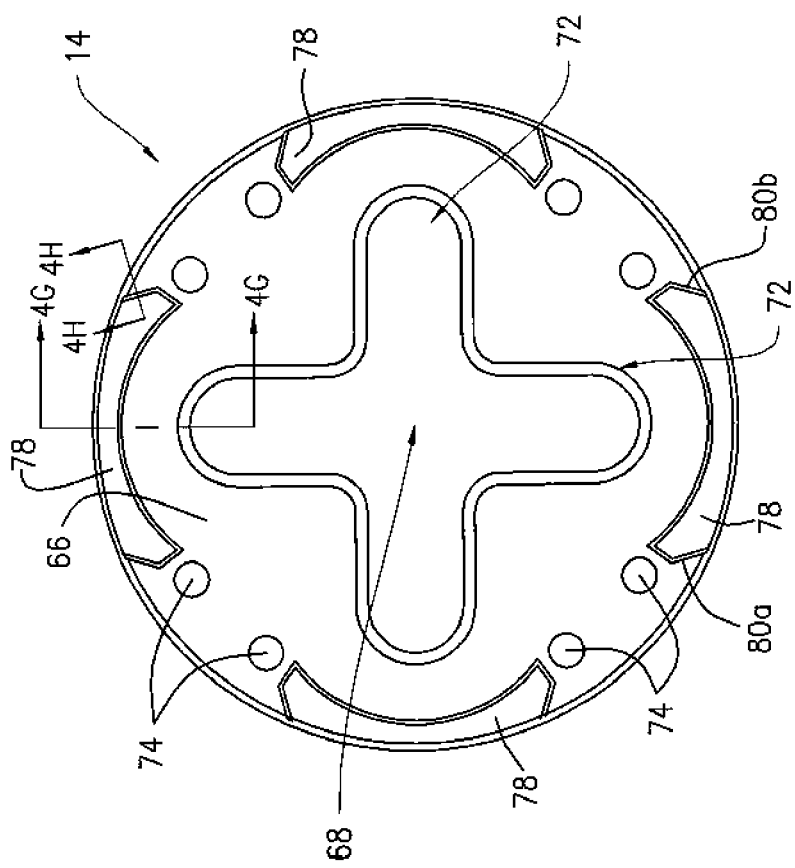
FIG. 4F is a bottom plan view of the plate shown in FIG. 4A.

Referring to FIGS. 1A through 2, in an embodiment, a tie down assembly 10 includes a cylindrical-shaped cup 12 and a disc-shaped plate 14 that is fastened removably to the cup 12. In an embodiment, the plate 14 is fastened to the cup 12 by a plurality of fasteners 16 (see FIGS. 1A and 2), which will be described in more detail below. In an embodiment, a plurality of O-rings 18 is positioned between the cup 12 and the plate 14 (see in particular FIG. 2), while each of a plurality of O-rings 20 is positioned between a corresponding one of the fasteners 16 and the plate 14 (see FIGS. 1B and 2). The purposes and functions of the O-rings 18, 20 shall be described hereinafter.

In an embodiment, the cup 12 and the plate 14 are each made from aluminum. In other embodiments, the cup 12 and the plate 14 are made from other suitable materials known in the art, such as other types of metals or metal alloys. In an embodiment, the cup 12 and the plate 14 are produced by forging. In another embodiment, the cup 12 and the plate 14 are produced by machining. While the cup 12 is cylindrical in shape, it may consist of other shapes and sizes, in accordance with other embodiments. While the plate 14 is disc-shaped, it may consist of other shapes and sizes, in accordance with other embodiments. The features and functions of the cup 12 and the plate 14 shall be described hereinafter.

Referring to FIGS. 2 and 3A through 3G, in an embodiment, the cup 12 includes a base 22 having a first surface 24 and a second surface 26 opposite the first surface 24, a ring-shaped first sidewall 28 extending from and encircling the first surface 24, and a ring-shaped second sidewall 30 extending from and encircling the second surface 26. In an embodiment, the first sidewall 28 terminates at an upper end 32 and forms and interior portion 34, while the second sidewall 30 terminates at a lower end 36 opposite the upper end 32. In another embodiment, the cup 12 does not include the second sidewall 30. In an embodiment, a circular-shaped flange 38 extends from and surrounds the perimeter of the second sidewall 30 proximate to the lower end 36. The flange 38 includes a top surface 40 and a bottom surface 42 opposite thereof. In an embodiment, a first plurality of spaced-apart ribs 44 extend from an outer surface 46 of the second sidewall 30 and to the bottom surface 42 of the flange 38, while a second plurality of spaced-apart ribs 48 extend from the second surface 26 of the base 22 to an inner surface 50 of the second sidewall 30. In an embodiment, the ribs 44, 48 provide for strength and stiffness. In another embodiment, the cup 12 does not include the ribs 44, 48. In another embodiment, the cup 12 does not include the flange 38.

Figure 10C:
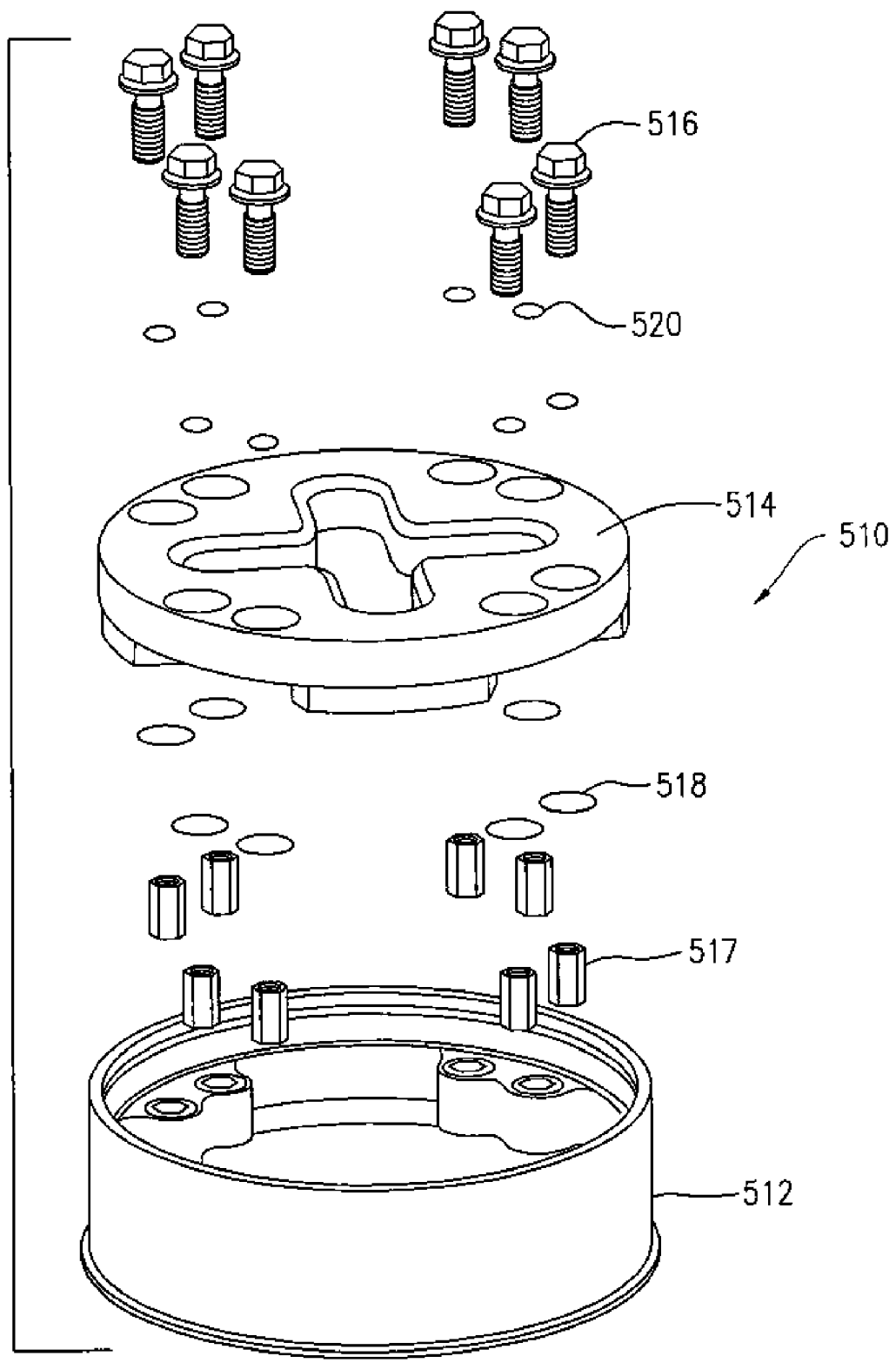

Still referring to FIGS. 2 and 3A through 3H, in an embodiment, the cup 12 includes a plurality of spaced-apart, raised seats 52. In an embodiment, each of the seats 52 includes a sidewall 54 that extends from the first surface 24 of the cup 12 to a point proximate to the upper end 32. In an embodiment, spaces 56 are formed between a pair of adjacent seats 52. In an embodiment, each of the seats 52 further includes a top surface 58 and a pair of circular-shaped apertures 60 and a groove 62 that are formed within the top surface 58. In an embodiment, each of the grooves 62 extends around the perimeter of the corresponding seat 52. In an embodiment, each of the grooves 62 is sized and shaped to receive one of the O-rings 18. As to be described in more detail below, in an embodiment, each of the apertures 60 is sized and shaped to receive one of the fasteners 16. In an embodiment, the fasteners 16 are threaded bolts and each of the apertures 60 is sized and shaped to receive threaded inserts (not shown in FIGS. 2 and 3A through 3H, but see the threaded inserts 517 shown in FIG. 10C) each of which threadedly engages a corresponding one of the fasteners 16. In an embodiment, the threaded inserts are RECOILS® brand of inserts made by Alcoa Fastening Systems, but other brands of inserts may be utilized. In another embodiment, each of the apertures 60 includes internal threads (not shown in the Figures) that threadedly engage a corresponding one of the fasteners 16. In an embodiment, the cup 12 includes four of the seats 52, which are arranged in a cross-like pattern (i.e., positioned 90 degrees from each other). In other embodiments, the cup 12 may include more or less than four of the seats 52. In an embodiment, each of the seats 52 includes two of the apertures 60. In other embodiments, each of the seats 52 includes more or less than two of the apertures 60.

Referring to FIGS. 4A through 4H, in an embodiment, the plate 14 includes a first surface 64 and a second surface 66 opposite the first surface 64, and a centrally located, cross-shaped aperture 68 that extends from the first surface 64 to the second surface 66, forming an inner wall 70. In an embodiment, as a result of its cross-shape, the aperture 68 includes a plurality of finger-shaped arms 72, whose purpose shall be described hereinafter. In other embodiments, the aperture 68 consists of other shapes and sizes (e.g., circular, square, star, polygonal, etc.). In an embodiment, the plate 14 further includes a plurality of circular-shaped counter bores 74 that extend from the first surface 64 to the second surface 66 of the plate 14. In an embodiment, the counter bores 74 are grouped in pairs between two adjacent fingers 72 of the aperture 68, and are arranged in a cross-like pattern (i.e., positioned 90 degrees from each other). In an embodiment, each of the counter bores 74 includes a circular-shaped groove 76 that is sized and shaped to receive one of the O-rings 20 (see FIG. 4E). In an embodiment, the plate 14 includes four pairs of the counter bores 74, for a total of eight. In other embodiments, the plate 14 may include more or less than eight of the counter bores 74.

Referring to FIGS. 4A through 4H, in an embodiment, the plate 14 includes a plurality of arc-shaped tabs 78 that extend from the second surface 66 thereof. In an embodiment, the tabs 78 may consist of other shapes and sizes. Each of the tabs 78 has a pair of opposed ends 80a, 80b. In an embodiment, each of the tabs 78 is positioned proximate to the perimeter of the plate 14 and intermediate two adjacent pairs of the counter bores 74, forming a cross-like pattern (i.e., positioned 90 degrees from each other). In an embodiment, the plate 14 includes four of the tabs 78. In other embodiments, the plate 14 may include more or less than four of the tabs 78.

In an embodiment, the plate 14 is fastened to the cup 12 by the fasteners 16. More particularly, in an embodiment, the plate 14 is sized and shaped to fit within the interior 34 of the cup 12, with the second surface 66 of the plate 14 being seated on the top surface 58 of the seats 52. In an embodiment, the O-rings 18 provide a seal between the plate 14 and the cup 12 and protect the threads of the fasteners 16 from corrosion. In an embodiment, each of the tabs 78 of the plate 14 is positioned within one of the spaces 56 of the cup 12, and the ends 80a, 80b of the tabs 78 are positioned proximate to the sidewalls 54 of the seats 52. In an embodiment, the tabs 78 inhibit the rotation of the plate 14 relative to the cup 12. In an embodiment, the tabs 78 provide stiffness to the plate 14. In an embodiment, each of the counter bores 74 of the plate 14 aligns with a corresponding one of the apertures 60 of the cup 12. In an embodiment, each of the O-rings 18 is inserted within a corresponding one of the grooves 62 of one of the seats 52. In an embodiment, each of the fasteners 16 is inserted into a corresponding one of the counter bores 74 of the plate 14 and, in turn, threadedly engages a corresponding one of the apertures 60 of the cup 12, thereby securing the plate 14 to the cup 12. In an embodiment, the O-rings 20 provide a seal between the fasteners 16 and the plate 14 within the counter bores 74 of the plate 14, and protects the threads of the fasteners 16 from corrosion. In another embodiment, the counter bores 74 are filled with a sealant when the fasteners 16 are installed to protect the fasteners 16 from corrosion.

Figure 5C:
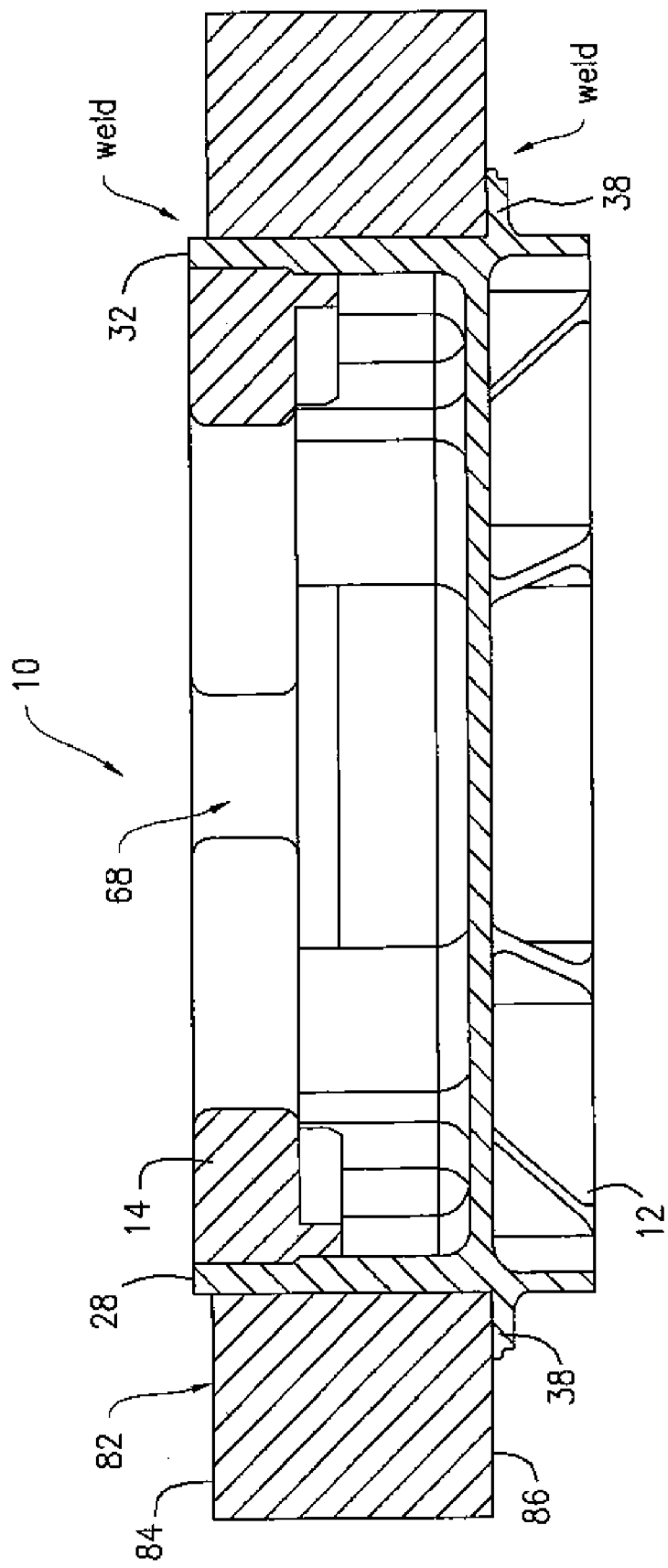

Referring to FIGS. 5A through 5C, in an embodiment, the tie down assembly 10 is secured to a vessel's deck 82 having an upper surface 84 and a lower surface 86. In an embodiment, the deck 82 is made from aluminum. In other embodiments, the deck 82 is made from other materials, such as metals and metal alloys. In another embodiment, the deck 82 is made from composites. In an embodiment, the deck 82 includes a solid portion(s). In another embodiment, the deck 82 is corrugated (not shown in the Figures). In another embodiment, the deck 82 is a multi-hollow extrusion (not shown in the Figures). In another embodiment, the deck 82 is characterized by complex structural geometry (not shown in the Figures).

In an embodiment, the tie down assembly 10 is installed by first boring a hole into the deck 82 which an extends from the upper surface 84 to the lower surface 86 of the deck 82 (not shown in the Figures). In an embodiment, the diameter of the hole is substantially equal to the diameter of the first sidewall 28 of the cup 12. In an embodiment, the tie down assembly 10 is inserted into the hole through the lower surface 86 and into the upper surface 84 of the deck 82. In an embodiment, the flange 38 of the cup 12 abuts the lower surface 86 of the deck 82. In an embodiment, the upper end 32 of the cup 12 protrudes slightly above the upper surface 84 of the deck 82, leaving the plate 14 and particularly the aperture 68 exposed within the upper surface 84. In another embodiment, the upper end 32 of the cup 12 is flush with the upper surface 84 of the deck 82.

In an embodiment, when the tie assembly 10 is within position, the upper end 32 of the cup 12 is welded to the upper surface 84 of the deck 82, while the flange 38 is welded to the lower surface 86 of the deck 82. As a result, a seal is formed between the tie down assembly 10 and the deck 82, which prevents corrosion from foreign substances, such as seawater. In an embodiment, the plate 14 is installed within the cup 12 after the cup 12 has been secured to the deck 82.

Figure 10D:
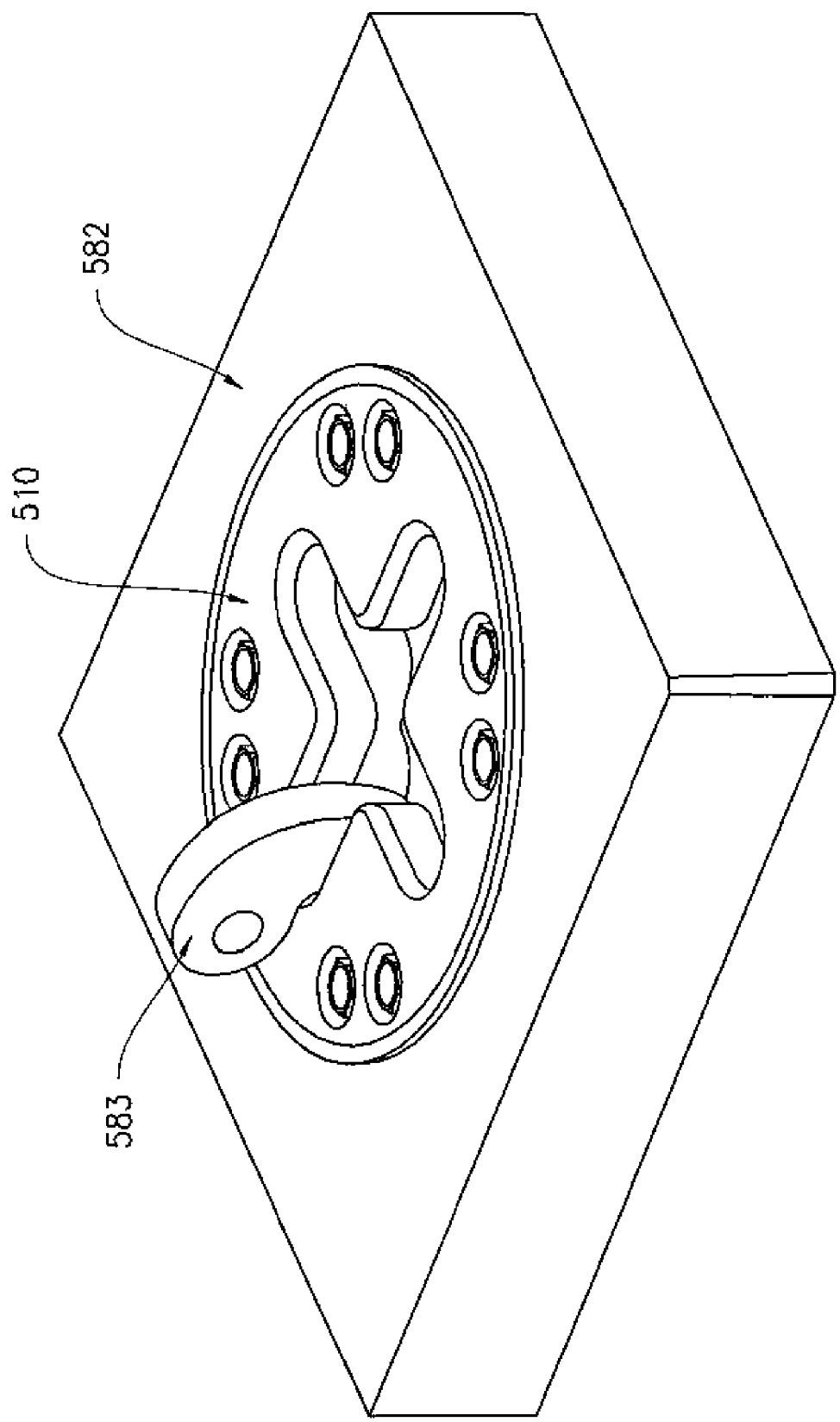

In an embodiment, the aperture 68 of the plate 14 is sized and shaped to accommodate the receipt of various tie down connectors, such as hooks, clips, cables, rope, etc. (for example, a hook 583 as shown in FIG. 10D). In an embodiment, the flange 38, having wrought properties, carries a vertical load applied by the connectors to the tie down assembly 10, and, therefore, such vertical load is not entirely held by the welds. In another embodiment, as indicated above, the tie down assembly 10 does not include the flange 38. In an embodiment, there is a radial fit between the plate 14 and the first sidewall 28 of the cup 12. In an embodiment, the diametrical tolerance (i.e., clearance) between the plate 14 and the first sidewall 28 of the cup 12 is in a range of about 10 to 20 thousands of an inch. In an embodiment, the cup 12 carries shear loads applied by the connectors to the tie down assembly 10. In an embodiment, the shear loads are transmitted from the plate 14, to the cup 12, to the weld, and to the deck 82. In an embodiment, the transmission of the shear load between the plate 14 and the deck 82 is in a substantially straight line. In an embodiment, the tie down assembly 10 may endure a load of up to about 70,000 lbs. at a 45° angle measured from the first surface 64 of the plate 14. As indicated above, in an embodiment, the tabs 78 of the plate 14 inhibit rotation relative to the cup 12, thereby providing stability of the tie down assembly 10 during use.

In the event that the plate 14 requires repair or replacement, it is easily removed from the tie down assembly 10 by unfastening the fasteners 16. As a result, the plate 14 is easily lifted out of the cup 12, which remains attached to the deck 82.

In an embodiment, the cup 12 and the plate 14 and the deck 82 are each made from aluminum. This allows for the tie down assembly 10 to be installed into the deck 82 without the need for costly and lengthy manufacturing and installation processes. It also eliminates the need for bimetallic joining of the tie down assembly 10 to the deck 82. In addition, the tie down assembly 10 requires minimal assembly time and skill to install, thereby reducing installation costs. The tie down assembly 10 is also compact, is lightweight, and requires less space to install. In an embodiment, there is no need to cut out the tie down assembly 10 from the deck 82 if only the plate 14 requires repair or replacement.

Figure 6B:
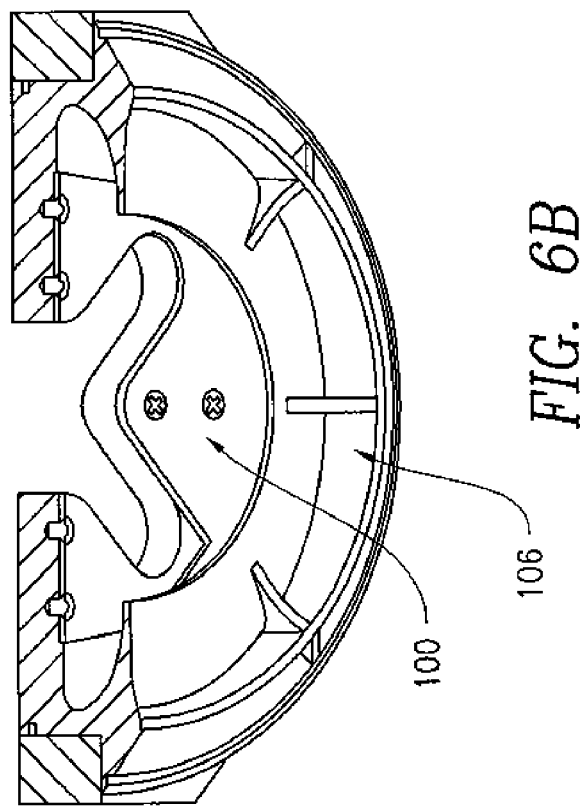
FIGS. 6A through 6C illustrate an embodiment of a wear plate assembly employed by the tie down assembly shown in FIG. 1A.
Figure 6A:
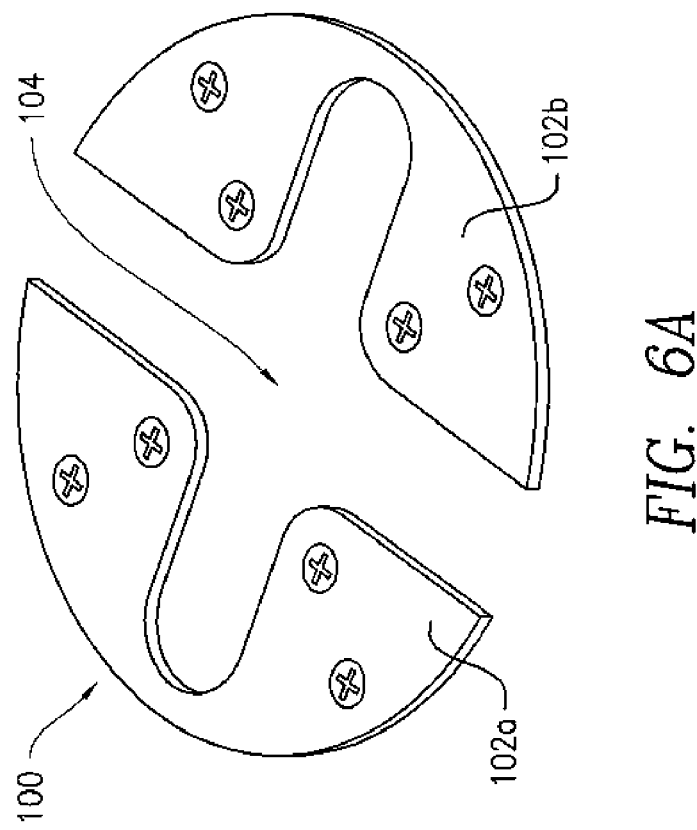
Figure 6C:
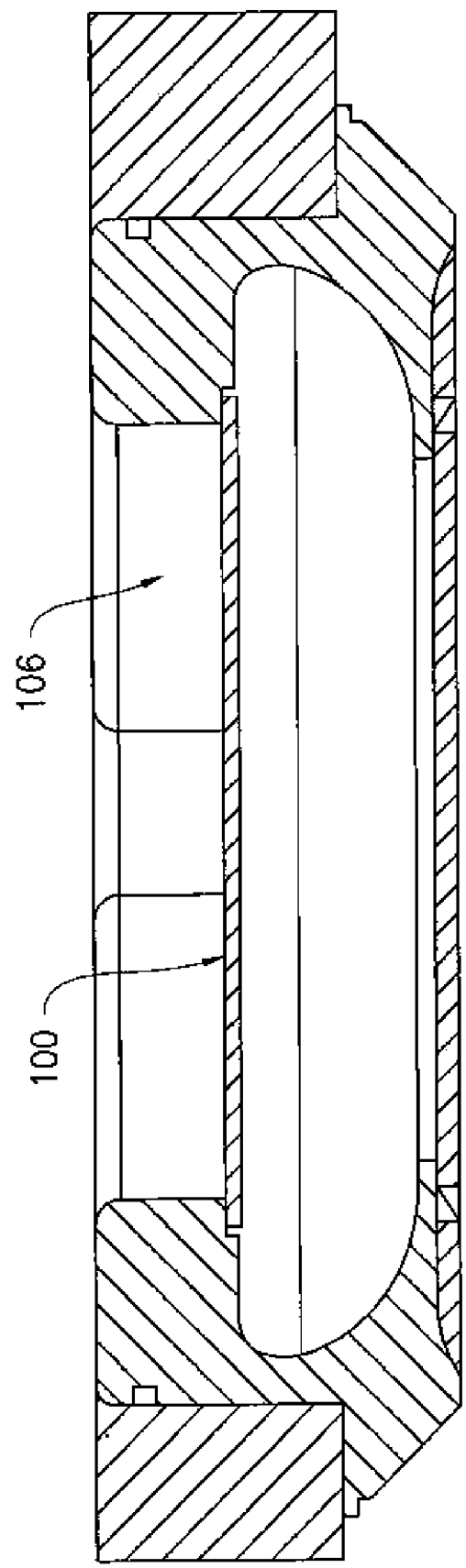

In an embodiment, the tie down assembly 10 includes a wear plate that prevents wear in the plate 14 from where it contacts the tie down hooks, as well as preventing localized contact deformations on the plate 14. FIGS. 6A through 6B show an embodiment of a circular-shaped wear plate 100, which includes two sections 102a, 102b, each constituting one-half of the wear plate 100. In an embodiment, the sections 102a, 102b form a cross-shaped aperture 104 that is sized and shaped to be substantially similar to the aperture 68 of the plate 14. In an embodiment, the wear plate 100 is fastened to the second surface 66 of the plate 14, such that the aperture 68 of the plate 14 and the aperture 104 of the wear plate 100 are aligned with one another. FIGS. 6B and 6C show the wear plate 100 installed on another embodiment of a tie down assembly 106. In an embodiment, the wear plate 100 is made from metal, such as aluminum, an aluminum alloy, steel, or a steel alloy. In other embodiments, the wear plate 100 is made from other suitable materials known in the art.

Figure 7B:
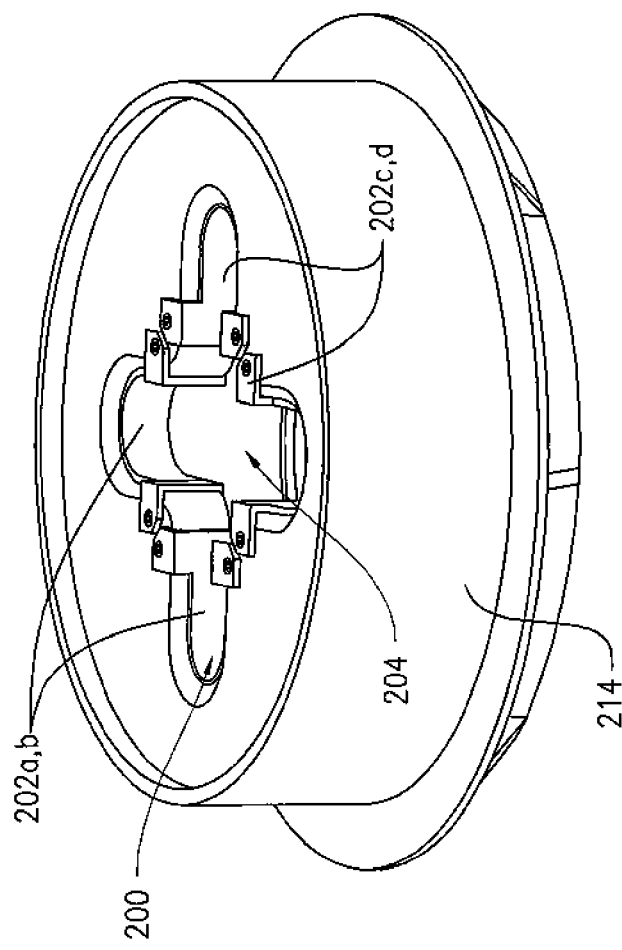
FIGS. 7A through 7C illustrate another embodiment of a wear plate assembly employed by the tie down assembly shown in FIG. 1A.
Figure 7A:
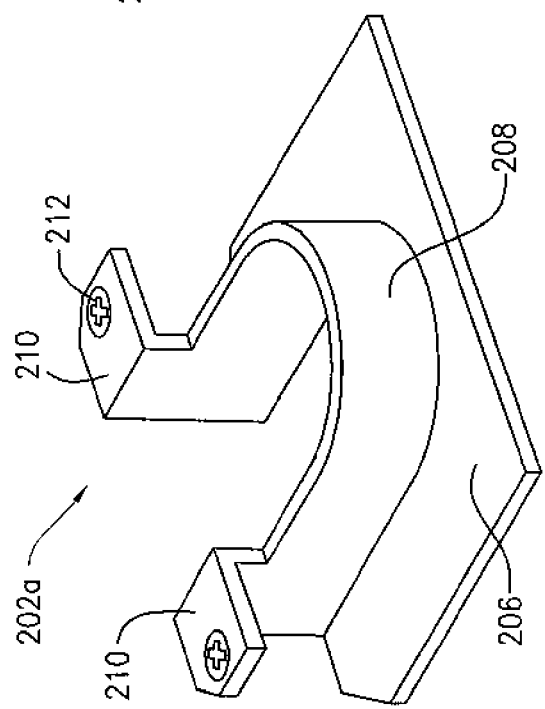
Figure 7C:
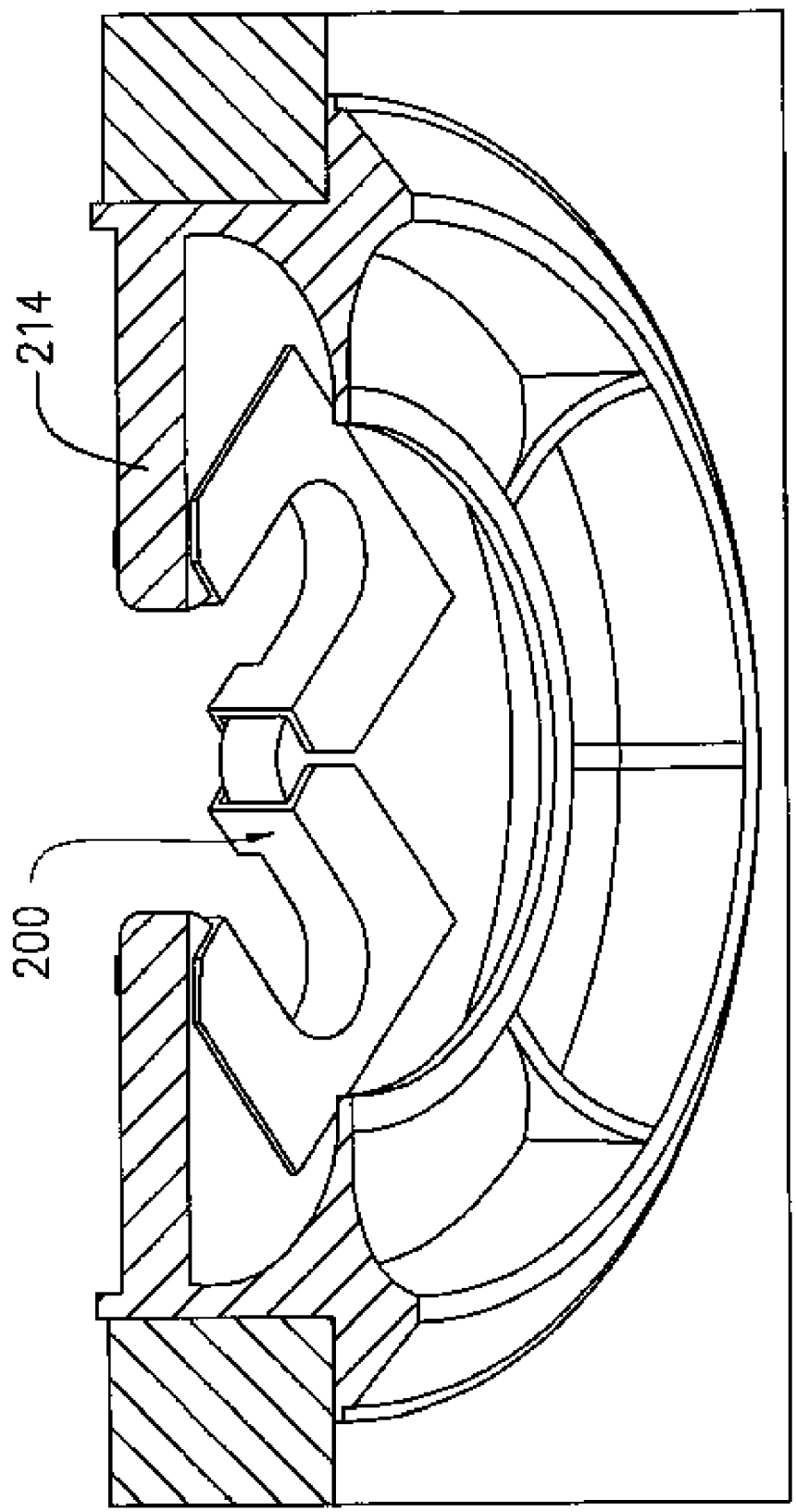

FIGS. 7A through 7C show another embodiment of a wear plate 200, which includes four sections 202a through 202d, each of which constitutes one-quarter of the wear plate 200. In an embodiment, the sections 202a through 202d form a cross-shaped aperture 204 that has a size and shape that are substantially similar to those of the aperture 68 of the plate 14. In an embodiment, each of the sections 202a-d (with only section 202a being shown in FIG. 7A for simplicity) includes a base 206 and a horseshoe-shaped projection 208 having opposed tabs 210 at the ends thereof. In an embodiment, each of the sections 202a through 202d is mounted to the plate 14, such that the base 206 is juxtaposed with the second surface 66 of the plate 14 and the projection 208 is fitted within one of the fingers 72 and juxtaposed with the inner wall 70 of the plate 14. In an embodiment, the tabs 210 receive fasteners 212 to fasten the sections 202a through 202d to the first surface 64 of the plate 14. FIGS. 7B and 7C show the wear plate 200 installed on another embodiment of a tie down assembly 214. In an embodiment, the wear plate 200 is made from metal, such as aluminum, an aluminum alloy, steel, or a steel alloy. In other embodiments, the wear plate 200 is made from other suitable materials known in the art.

Figure 8B:
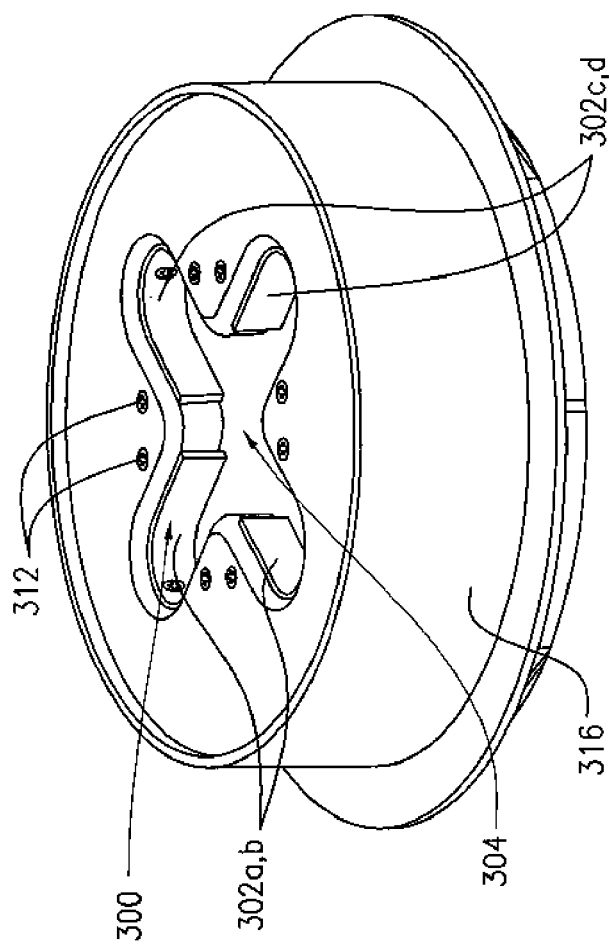
FIGS. 8A through 8C illustrate another embodiment of a wear plate assembly employed by the tie down assembly shown in FIG. 1A.
Figure 8A:
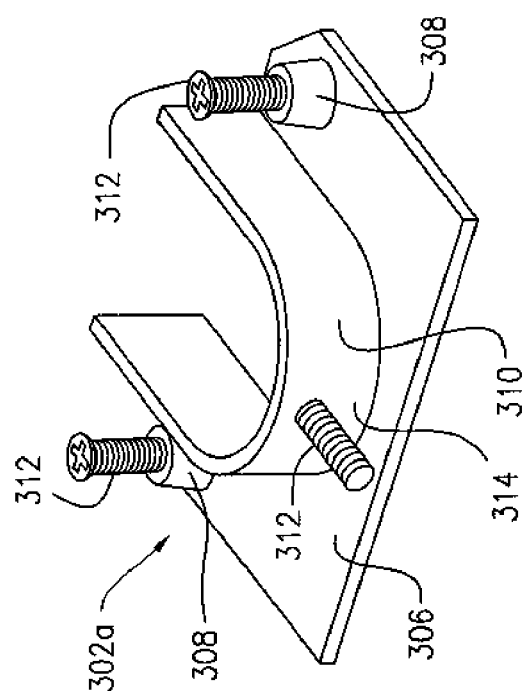
Figure 8C:
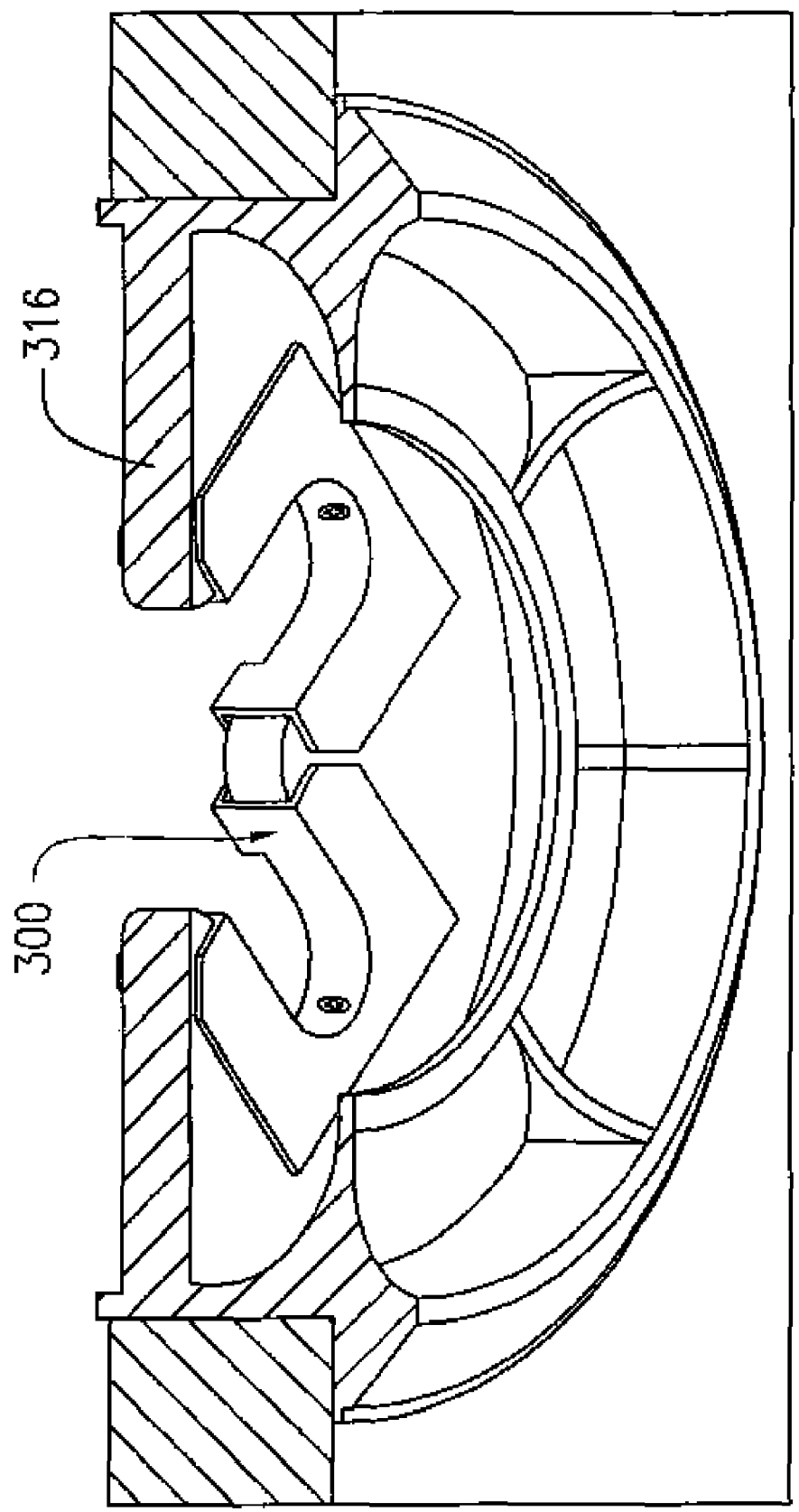
Figure 9B:
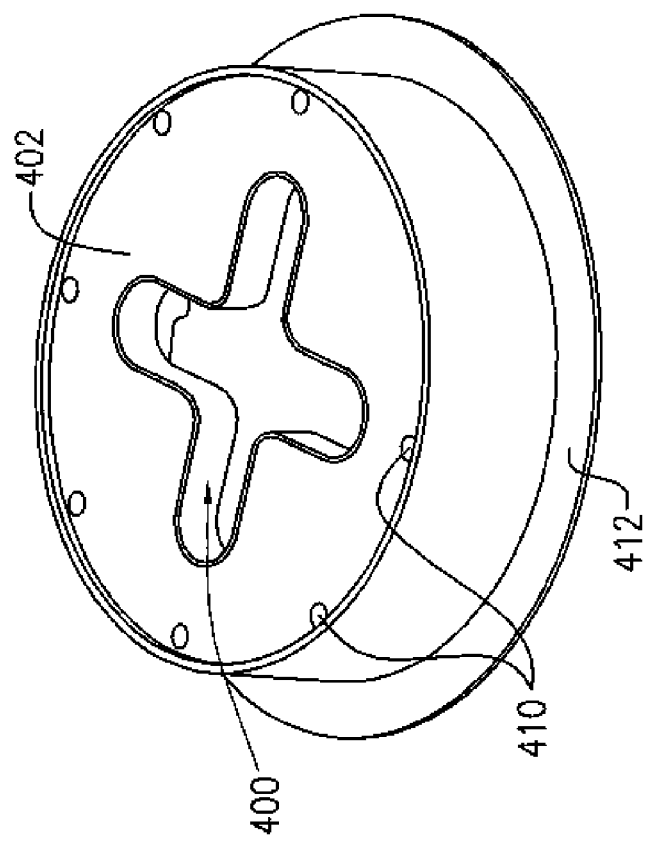
Figure 9A:
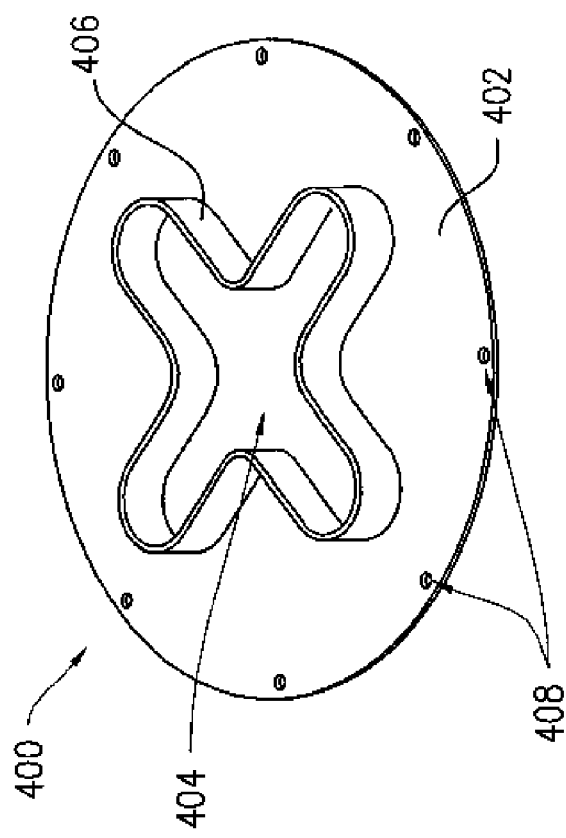
Figure 9C:
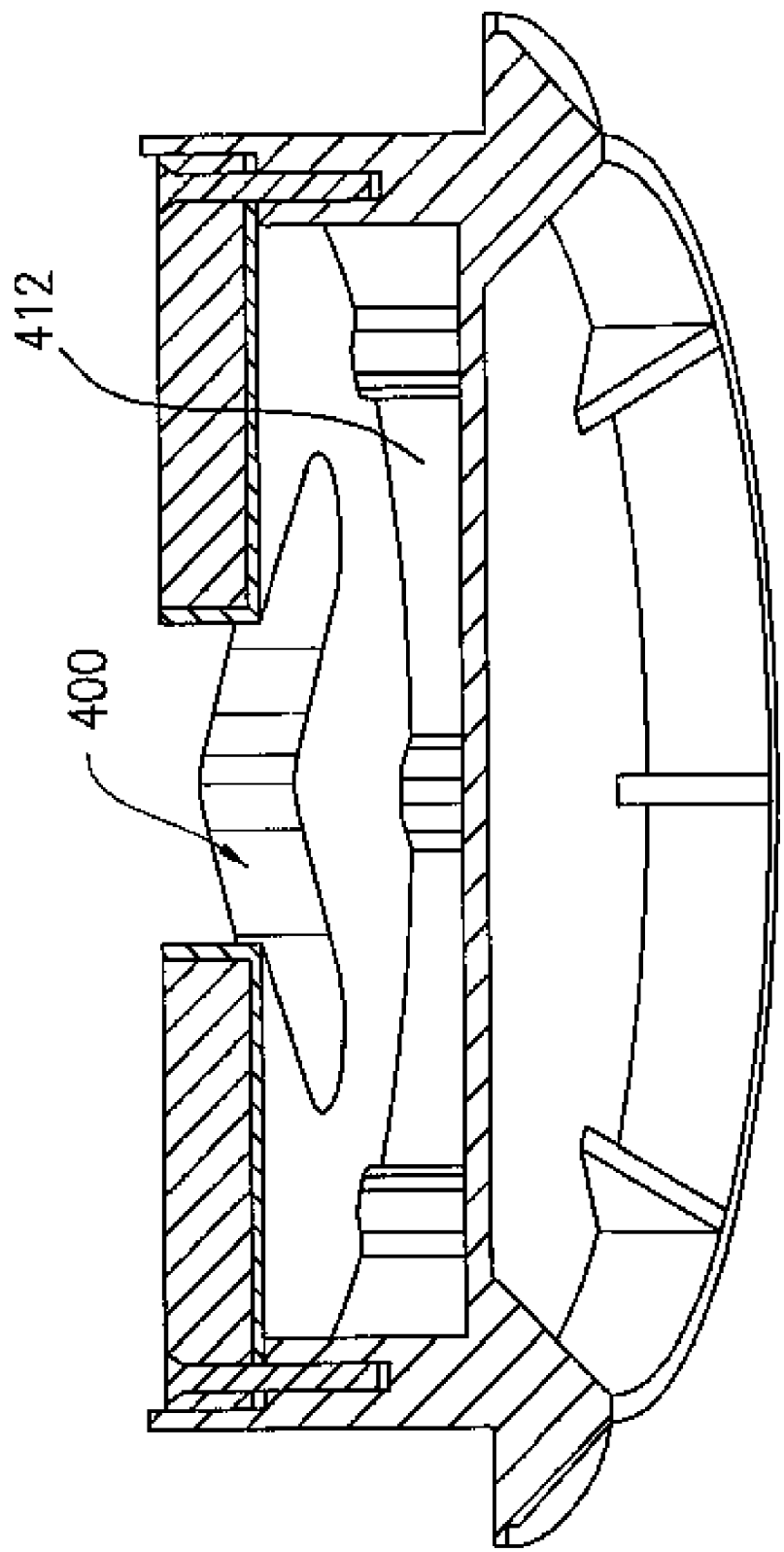

FIGS. 8A through 8C show another embodiment of a wear plate 300, which includes four sections 302a through 302d, each of which constitutes one-quarter of the wear plate 300. In an embodiment, the sections 302a-d form a cross-shaped aperture 304 that has a size and shape that are substantially similar to those of the aperture 68 of the plate 14. In an embodiment, each of the sections 302a-d (with only section 302a being shown in FIG. 8A for simplicity) includes a base 306 having a pair of bosses 308 extending upwardly therefrom, and a U-shaped projection 310 extending upwardly therefrom. In an embodiment, each of the sections 302a through 302d is mounted to the plate 14, such that the base 306 is juxtaposed with the second surface 66 of the plate 14 and the projection 310 is fitted within one of the fingers 72 and juxtaposed with the inner wall 70 of the plate 14. In an embodiment, the bosses 308 receive fasteners 312 to fasten the sections 302a-d to the plate 14. In an embodiment, a portion 314 of the projection 310 includes an aperture (not shown in the Figures) to receive one of the fasteners 312 for mounting to the inner wall 70 of the plate 14. FIGS. 8B and 8C show the wear plate 300 installed on another embodiment of a tie down assembly 316. In an embodiment, the wear plate 300 is made from metal, such as aluminum, an aluminum alloy, steel, or a steel alloy. In other embodiments, the wear plate 300 is made from other suitable materials known in the art.

FIGS. 9A through 9E show an another embodiment of a wear plate 400, which includes a circular-shaped base 402, a centrally located, cross-shaped aperture 404, a projection 406 that extends upwardly from the base 402 and around the perimeter of the aperture 404, and a plurality of circular-shaped apertures 408 formed within the perimeter of the base 402. In an embodiment, the aperture 404 has a size and shape that are substantially similar to those of the aperture 68 of the plate 14. In an embodiment, the wear plate 400 is mounted to the plate 14, such that the base 402 is juxtaposed with the second surface 66 of the plate 14 and the projection 406 is fitted within the aperture 68 of the plate 14 and is juxtaposed with the inner wall 70 of the plate 14. In an embodiment, the apertures 408 receive fasteners 410 to fasten the wear plate 400 to the plate 14. FIGS. 9B through 9E show the wear plate 400 installed on another embodiment of a tie down assembly 412. In an embodiment, the wear plate 400 is made from metal, such as aluminum, an aluminum alloy, steel, or a steel alloy. In other embodiments, the wear plate 400 is made from other suitable materials known in the art.

In an embodiment, the plate 14 may be coated with a coating for preventing wear from where the plate 14 makes contact with the tie down connectors. In an embodiment, the coating is applied to the first and second surfaces 64, 66 and the inner wall 70 of the plate 14. In an embodiment, the coating composition may consist of an aluminum/stainless steel blend manufactured by Alcoa Inc., and which is the subject of U.S. Pat. Nos. 5,884,388 and 6,290,032, which are incorporated herein by reference. In other embodiments, the coating may include an electroless nickel phosphorous coating, such as NIBORE™ brand of coating, a diamond chrome coating, a hard chrome coating, or a nickel cobalt coating, all of which are supplied by Bales Mold Service Inc. of Downers Grove, Ill. In other embodiments, the coating may include a wear-resistant cubic boron nitride, hard powder coating, such as TUFFTEK® brand of coating supplied by NanoMech, LLC d/b/a Duralor of Springdale, Ark. In other embodiments, other suitable coatings that prevent wear and are known in the art may be utilized.

Figure 10E:
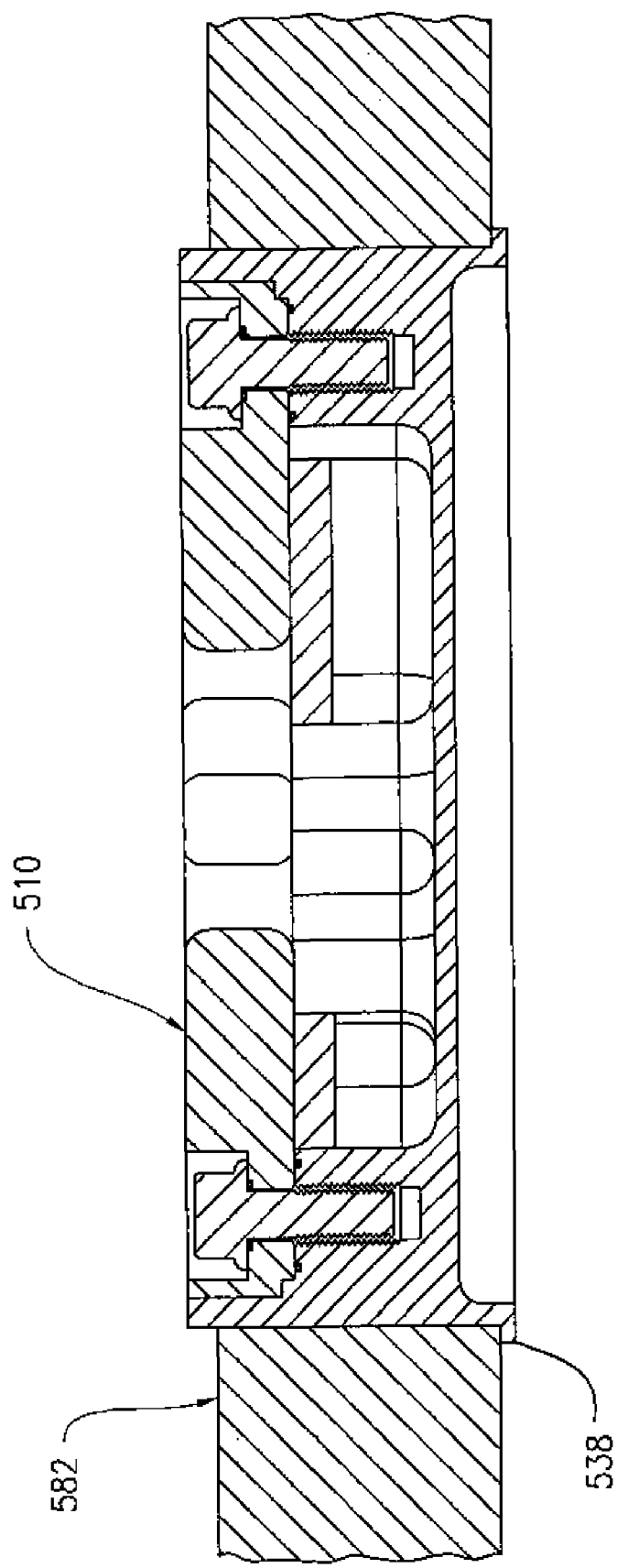

FIGS. 10A through 10E show a tie down assembly 510 in accordance with another embodiment. The tie down assembly 510 includes a cylindrical-shaped cup 512 and a disc-shaped plate 514 that is fastened removably to the cup 512. In an embodiment, the plate 514 is fastened to the cup 512 by a plurality of fasteners 516 that engage a plurality of threaded inserts 517 (see FIG. 10C). In an embodiment, a plurality of O-rings 518 is positioned between the cup 512 and the plate 514, while each of a plurality of O-rings 520 is positioned between a corresponding one of the fasteners 516 and the plate 514 (see FIG. 10C). Referring to FIGS. 10D and 10E, the tie down assembly 510 is installed within a deck 582 and is adapted to receive various tie down connectors, such a hook 583 (see FIG. 10D), and other types of hooks, clips, cables, rope, etc. In an embodiment, the tie down assembly 510 is similar in structure and function to the tie down assembly 10, with a few differences. For instance, in an embodiment, a flange 538 of the tie down assembly 510 extends from a sidewall 528 less prominently than that of the flange 38 from the first sidewall 28 of the tie down assembly 10. In addition, in an embodiment, the tie down assembly 510 does not include a second sidewall or ribs. As a result of the foregoing, in an embodiment, the weight of the tie down 510 assembly is reduced relative to the tie down assembly 10, and, in turn, the cost of manufacturing the assembly 510.

It will be understood that the tie down assemblies described herein are merely exemplary and that a person skilled in the art may make many variations and modifications without departing from the full spirit and the scope of the embodiment described herein. For example, the tie down assemblies 10, 510 may include failsafe components that enable the assemblies 10, 510 to fail prior to damaging the decking if overloaded, thereby saving high repair costs. Also, although the tie down assemblies 10, 510 are welded to the respective decks 82, 582 it could be attached to the decks by other suitable means known in the art, such as fasteners, adhesives, etc. In other embodiments, the tie down assemblies 10, 582 may be utilized in environments other than naval and maritime vessels, such as, for example, rail, aerospace, and motor vehicle transportation. Accordingly, all such variations and modifications are intended to be included within the scope of the invention as defined in the appended claims.

What is claimed is:

1. A tie down assembly, comprising:
a cup having a base with a first surface and a second surface opposite the first surface, a first sidewall extending from the first surface and terminating at a first end, an interior portion defined by the first sidewall, and a plurality of seats, each of which extends from the first surface and within the interior portion, wherein each of the plurality of seats includes a top surface having at least one aperture formed therein, and wherein each of the plurality of seats is spaced apart from the other of the plurality of seats such that a space is formed between each of an adjacent pair of the plurality of seats;
and a plate having a first surface, a second surface opposite the first surface of the plate, a first aperture extending from the first surface of the plate to the second surface of the plate, wherein the first aperture is cross-shaped and includes an inner wall and a plurality of arms, a plurality of second apertures extending from the first surface of the plate to the second surface of the plate, and a plurality of tabs, each of which extends from the second surface of the plate,
wherein the plate is attached removably to the cup within the interior portion of the cup by a plurality of fasteners such that each of the plurality of second apertures of the plate aligns with a corresponding one of the at least one aperture of the plurality of seats of the cup, wherein each one of the aligned second apertures of the plate and the at least one apertures of the plurality of seats of the cup is sized and shaped to receive a corresponding one of the plurality of fasteners, and wherein the first surface of the plate is positioned proximate to the first end of the cup, and wherein the second surface of the plate is positioned on each of the top surfaces of the plurality of seats, and wherein each of the plurality of tabs of the plate is positioned within a corresponding one of the spaces of the cup and is adapted to engage a corresponding one of the plurality of seats of the cup so as to inhibit rotation of the plate relative to the cup.

2. The tie down assembly of claim 1, wherein the plurality of tabs is adapted to provide stiffness to the plate.

3. The tie down assembly of claim 1, wherein each of the plurality of seats includes a groove formed within the top surface thereof, and wherein the groove is sized and shaped to receive an O-ring.

4. The tie down assembly of claim 1, wherein the cup and the plate are sized and shaped so as to form a radial fit between the first sidewall of the cup and the plate, whereby a shear load applied to the plate is transmitted to the cup.

5. The tie down assembly of claim 4, wherein the cup is cylindrical in shape and the plate is circular in shape.

6. The tie down assembly of claim 1, wherein the cup and the plate are each made from aluminum.

7. The tie down assembly of claim 6, wherein the tie down assembly is adapted to be installed within a structure.

8. The tie down assembly of claim 7, wherein the structure is made from aluminum.

9. The tie down assembly of claim 8, wherein the cup is welded to the structure.

10. The tie down assembly of claim 9, wherein the structure includes a deck of a vessel.

11. The tie down assembly of claim 7, wherein the cup includes a second sidewall extending from the second surface of the cup and terminating at a second end opposite the first end of the cup.

12. The tie down assembly of claim 11, wherein the second sidewall of the cup includes a flange extending therefrom, wherein the flange includes a first surface and a second surface opposite the first surface of the flange.

13. The tie down assembly of claim 12, wherein the cup includes a first plurality of ribs that extend from an outer surface of the second sidewall of the cup to the second surface of the flange, and a second plurality of ribs that extend from the second surface of the base of the cup to an inner surface of the second sidewall of the cup.

14. The tie down assembly of claim 13, wherein the structure includes a first surface and a second surface opposite the first surface of the structure, and a hole formed within the first and second surfaces of the structure, wherein the hole is sized and shaped to receive the cup, and wherein the flange of the cup is juxtaposed with the lower surface of the structure.

15. The tie down assembly of claim 1, further comprising a wear plate attached removably to the plate.

16. The tie down assembly of claim 15, wherein the wear plate includes a plurality of sections, wherein the plurality of sections forms an aperture that is sized and shaped to correspond and align with the first aperture of the plate.

17. The tie down assembly of claim 16, wherein each of the plurality of sections of the wear plate is attached to the second surface of the plate.

18. The tie down assembly of claim 17, wherein each of the plurality of sections of the wear plate includes a base and a projection extending from the base of the wear plate, the base of the wear plate being juxtaposed with the second surface of the plate, and the projection being sized and shaped to fit within one of the arms of the aperture of the plate and is juxtaposed with the inner wall of the plate.

19. The tie down assembly of claim 18, wherein each of the projections of the plurality of sections of the wear plate includes at least one tab extending therefrom, wherein each of the at least one tabs is adapted to receive a fastener for fastening the corresponding one of the plurality of sections to the first surface of the plate.

20. The tie down assembly of claim 18, wherein each of the bases of the plurality of sections of the wear plate includes at least one boss extending therefrom, wherein each of the at least one bosses is adapted to receive a fastener for fastening the corresponding one of the plurality of sections to the plate.

21. The tie down assembly of claim 15, wherein the wear plate includes a base having a first surface and a second surface opposite the first surface of the base of the wear plate, an aperture extending from the first surface of the base of the wear plate to the second surface of the base of the wear plate, and a projection extending from the base of the wear plate and surrounding a perimeter of the aperture of the wear plate, wherein the aperture of the wear plate is sized and shaped to correspond and align with the first aperture of the plate, wherein the base of the wear plate is juxtaposed with the second surface of the plate and the projection of the wear plate is fitted within the first aperture of the plate and juxtaposed with the inner wall of the plate.

22. The tie down assembly of claim 15, wherein the wear plate is made from aluminum.

* * * * *